INVENTOR.
William L. McNamara
BY Norman T. Holland
his ATTORNEY.

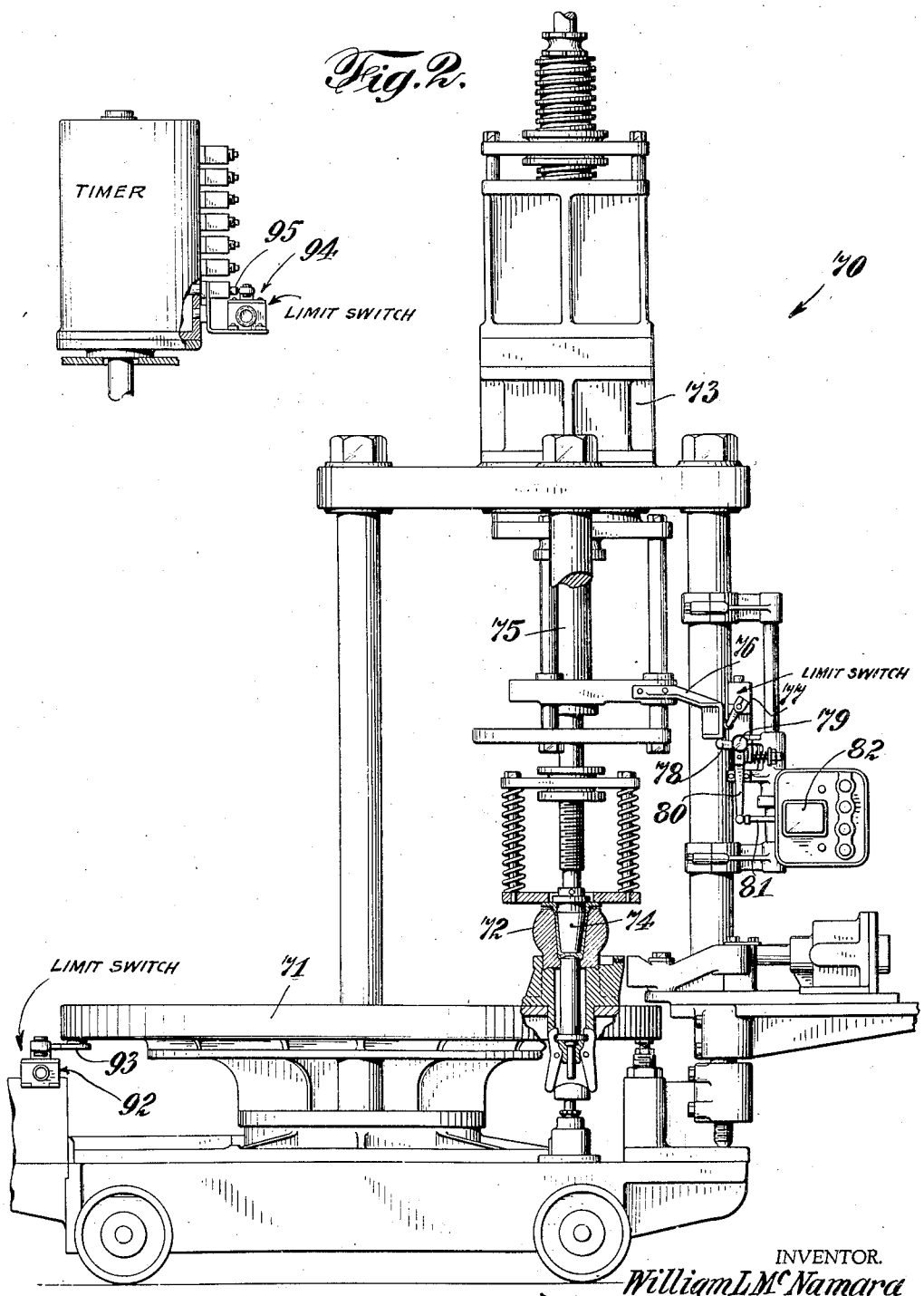

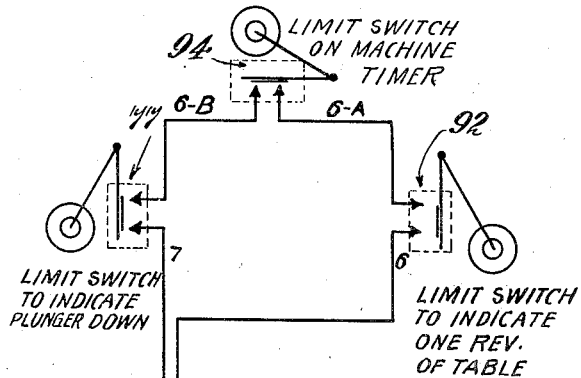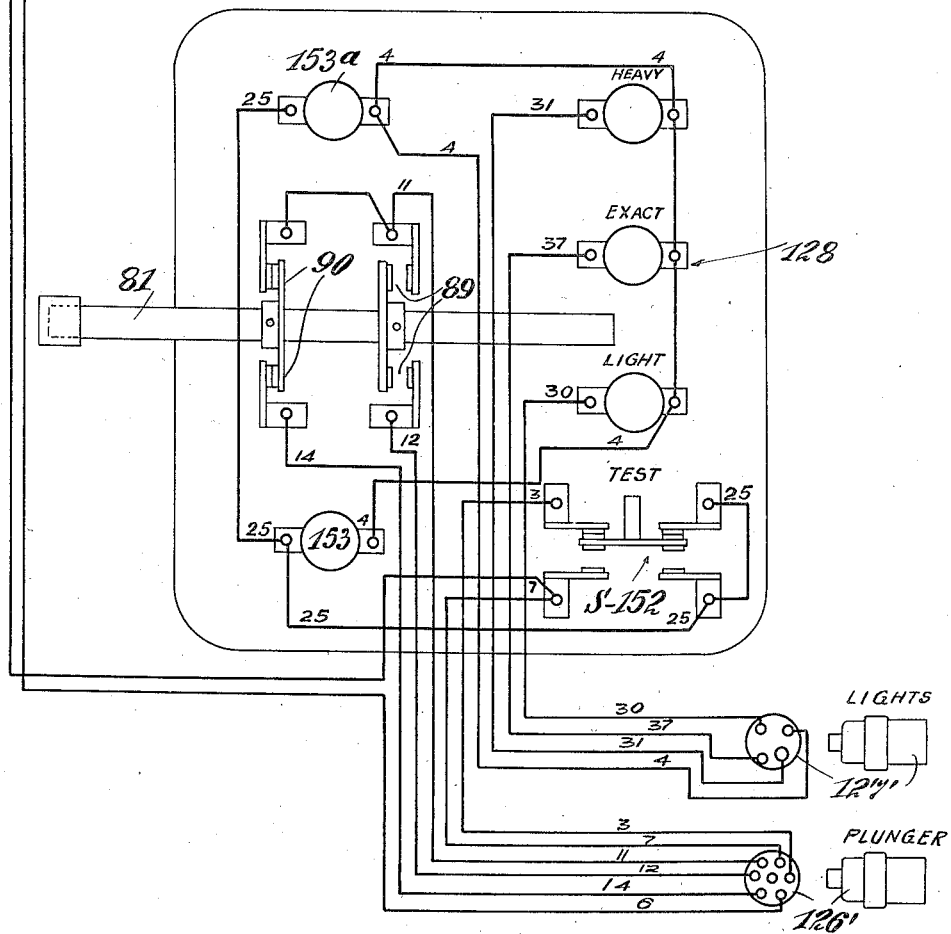

Dec. 29, 1942.    W. L. McNAMARA    2,306,789
AUTOMATIC WEIGHT REGULATOR
Filed March 10, 1938    11 Sheets-Sheet 4
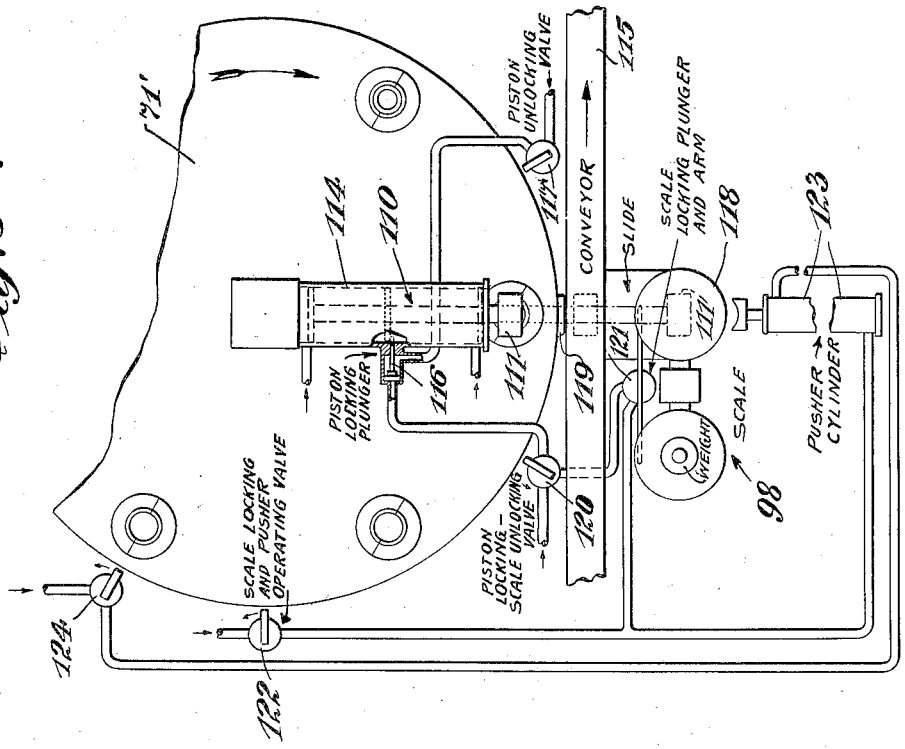
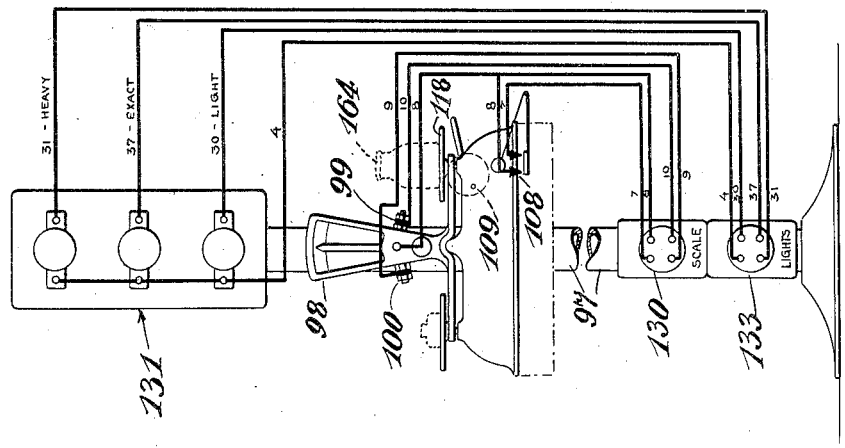
INVENTOR.
William L. McNamara
BY Norman T. Holland
his ATTORNEY.

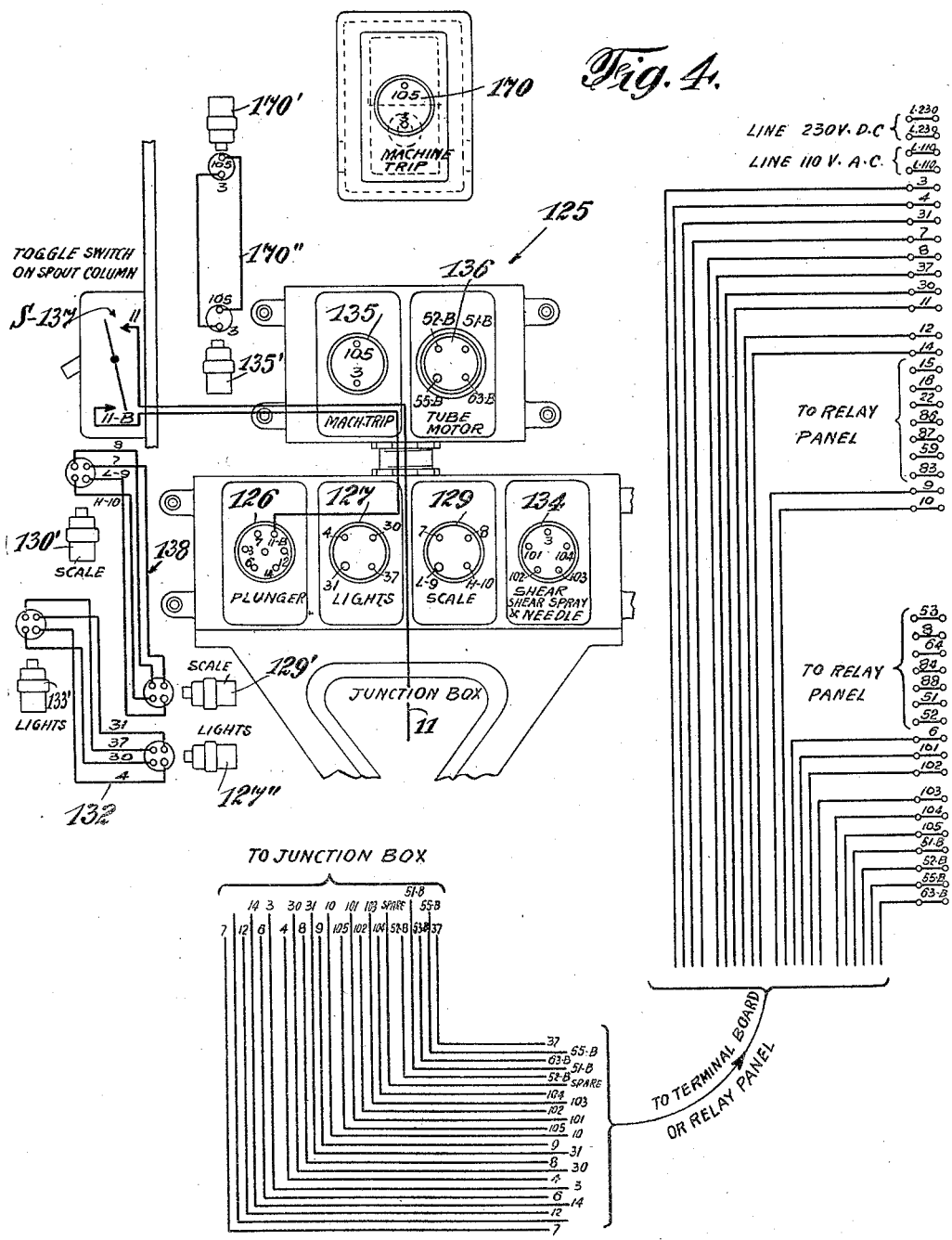

Dec. 29, 1942.  W. L. McNAMARA  2,306,789
AUTOMATIC WEIGHT REGULATOR
Filed March 10, 1938  11 Sheets-Sheet 6
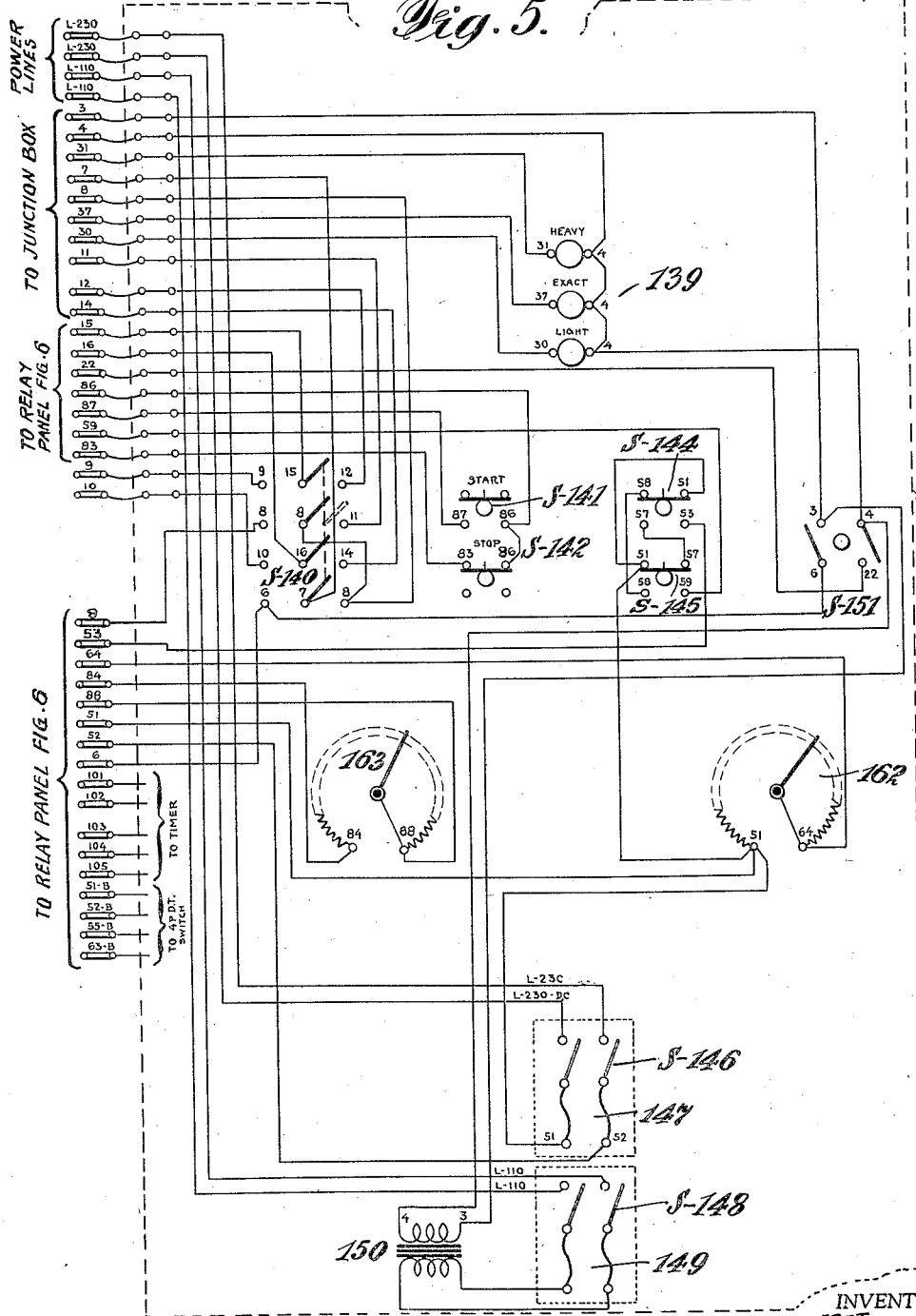
INVENTOR.
William L. McNamara
BY
his ATTORNEY.

Dec. 29, 1942. W. L. McNAMARA 2,306,789
AUTOMATIC WEIGHT REGULATOR
Filed March 10, 1938 11 Sheets-Sheet 7

INVENTOR.
William L. McNamara
BY Norman N. Ireland
ATTORNEY.

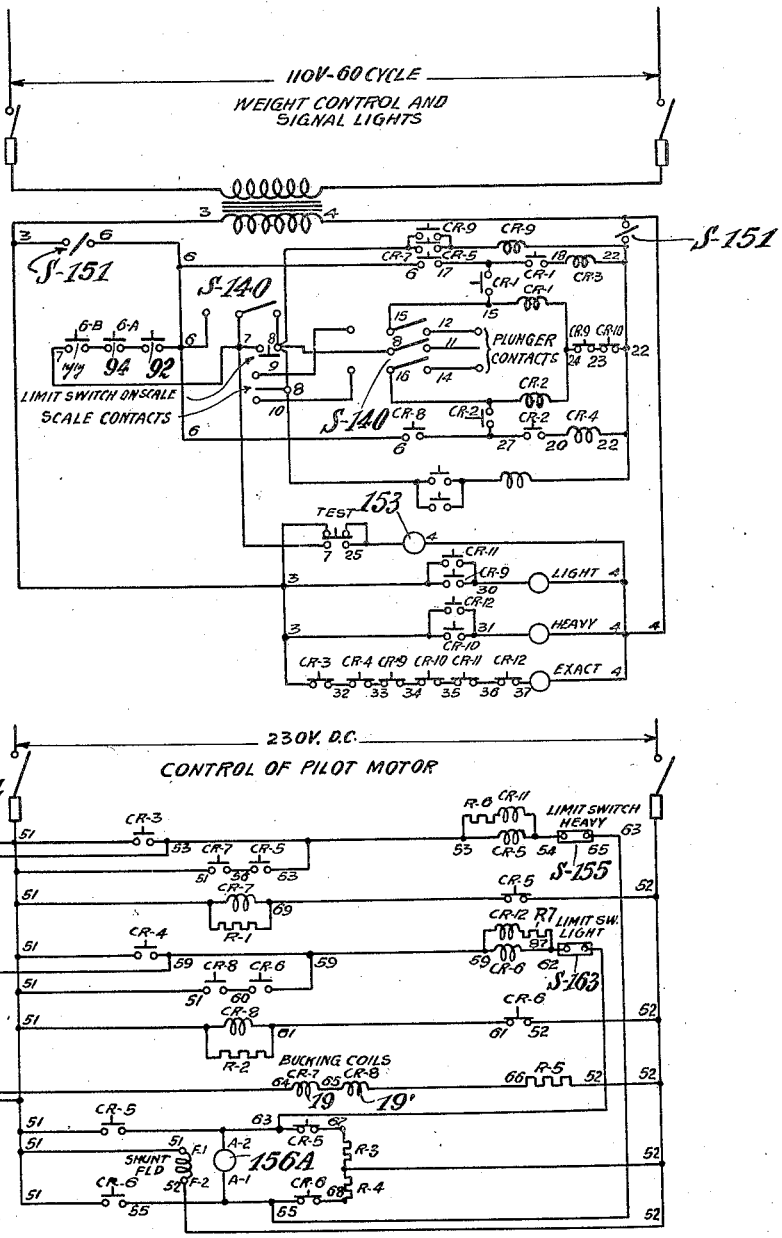

Dec. 29, 1942. W. L. McNAMARA 2,306,789
AUTOMATIC WEIGHT REGULATOR
Filed March 10, 1938 11 Sheets-Sheet 9
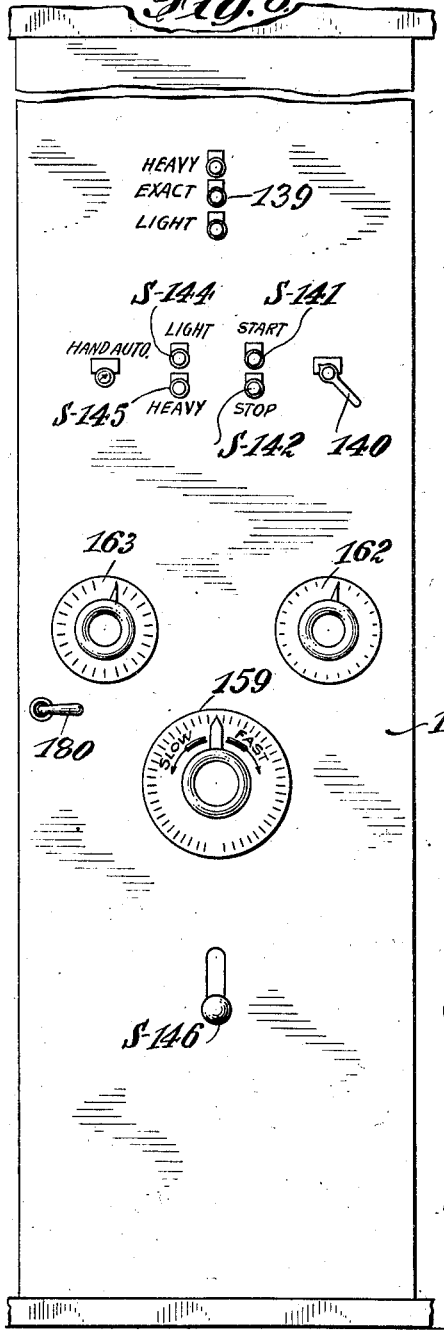
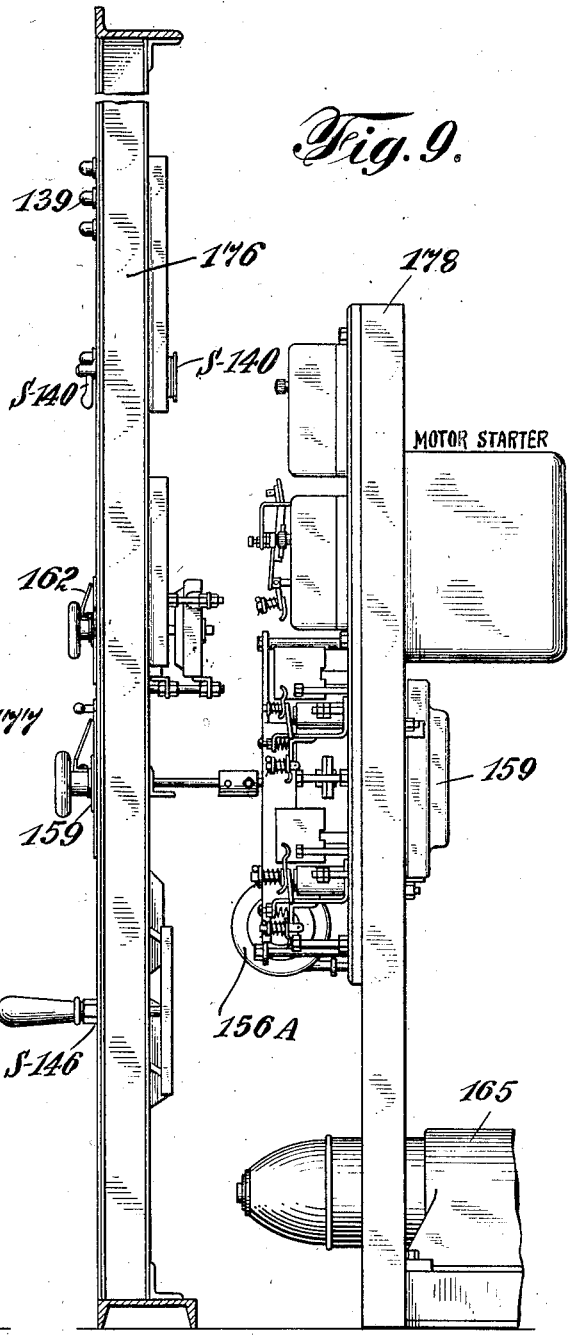
INVENTOR.
William L. McNamara Dec. 29, 1942.   W. L. McNAMARA   2,306,789
AUTOMATIC WEIGHT REGULATOR
Filed March 10, 1938    11 Sheets-Sheet 10
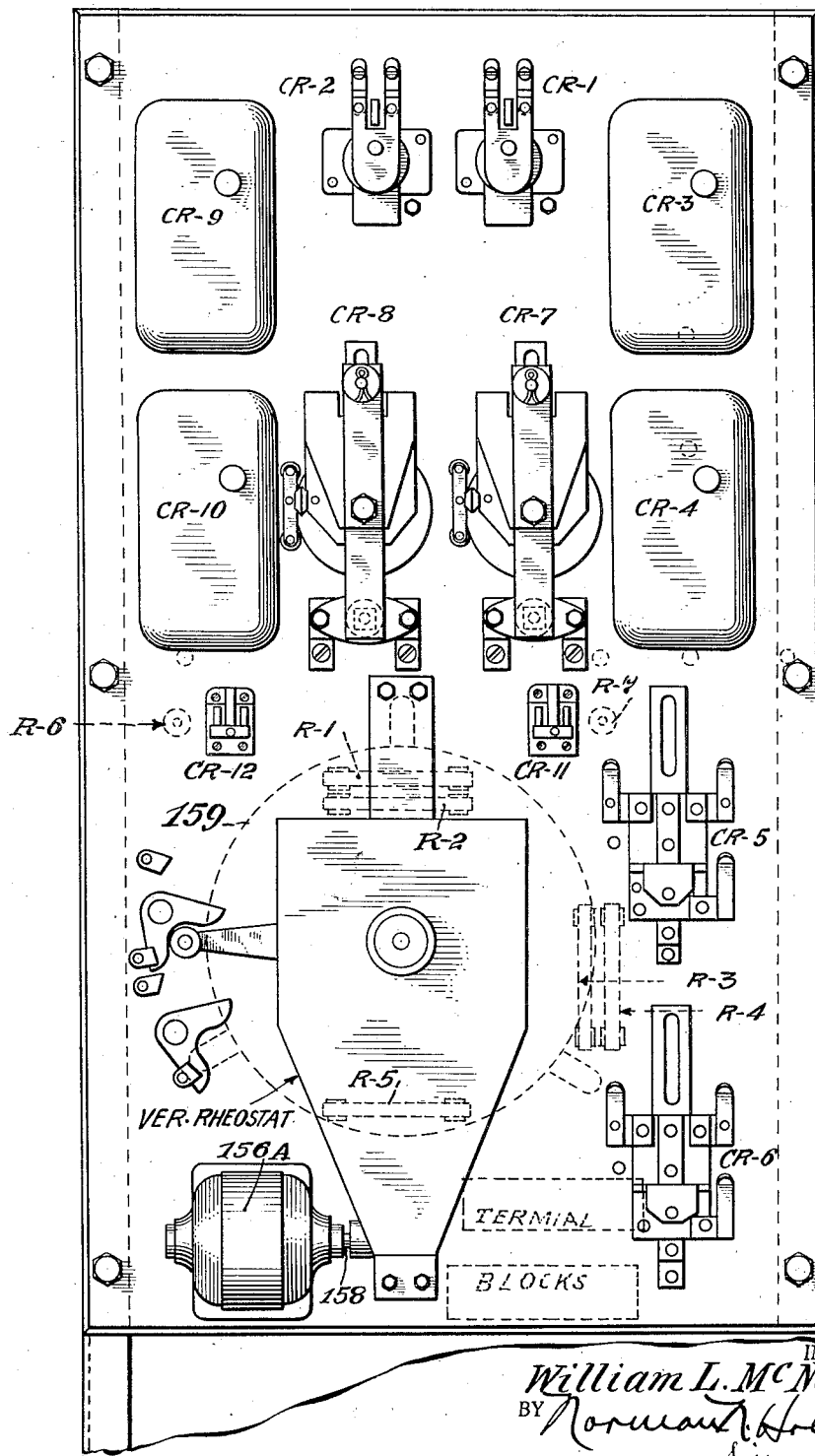
INVENTOR.
William L. McNamara
BY Norman ... Holland
his ATTORNEY.

Dec. 29, 1942. W. L. McNAMARA 2,306,789
AUTOMATIC WEIGHT REGULATOR
Filed March 10, 1938 11 Sheets-Sheet 11
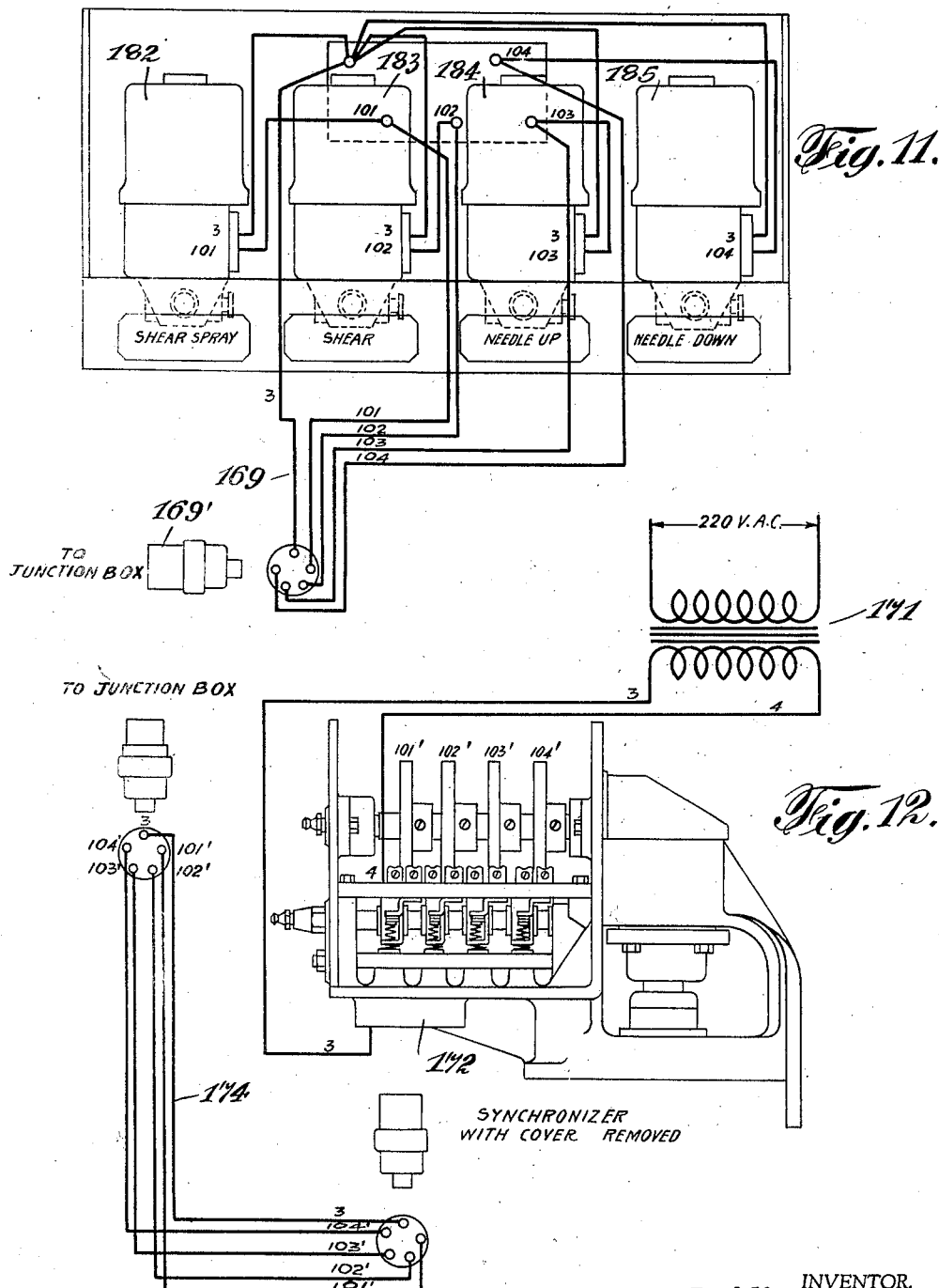

Patented Dec. 29, 1942

2,306,789

UNITED STATES PATENT OFFICE 2,306,789

AUTOMATIC WEIGHT REGULATOR

William L. McNamara, Connellsville, Pa., assignor to Capstan Glass Company, Connellsville, Pa., a corporation of Delaware Application March 10, 1938, Serial No. 195,187

30 Claims. (Cl. 49—55)

The present invention relates to glass machinery and more particularly to a method and device for regulating and controlling such machinery with a minimum of time and skill on the part of the operator and with a maximum of accuracy.

In the manufacture of glassware, such as glass containers, glass tableware and the like, the raw materials are fed gradually to a large furnace containing many tons of molten glass. A series of spouts or forehearths are provided about the furnace for conducting the molten glass from the furnace to a glass feeder, which controls the flow of the glass through an orifice in the forehearth. The glass feeder causes charges of molten glass to be delivered periodically through the orifice. A forming machine mounted below the forehearth having a series of molds for forming glass articles, receives the charges delivered in its respective molds and presses, blows, or presses and blows the ware into proper shape. The ware is then removed from the forming machine and placed on a conveyor which delivers it to an annealing leer. The annealing leer raises the temperature of the glass to a semi-molten condition so that the strains created in molding may be removed and thereafter the glass is gradually cooled to eliminate or minimize the formation of additional strains.

Due to limitations in the glass feeder operation and the changes of temperature and of other conditions of the molten glass in the forehearth and furnace, the charges of glass delivered by the feeder vary in size and weight. With certain types of ware, such as bottles, variations in the weight of the charges change the capacity of the containers which is objectionable. Such containers are generally filled by automatic filling machines delivering a fixed quantity of liquid predetermined to fill the bottle to a given point. If the capacity of the bottle varies, it will be either too full, which complicates the sealing, or not full enough, which causes complaints on the part of customers believing that they have "short" measure. In addition, too little glass in a container or other article is objectionable, because the ware may not have the required strength; and too much glass in an article results in a waste of glass and a loss to the manufacturer.

It has been customary for operators, either boys or men, to weigh at frequent intervals, the glass articles being delivered by the forming machines, and if the weight varies beyond a predetermined amount, to adjust the feeder for increasing or decreasing the size of the charges delivered. Frequently, the operators do not check the weight of the ware sufficiently often and defective or sub-standard ware is delivered. In addition, frequent weighing of containers and adjustments of the feeder require a substantial part of the operator's time and gives him less time for other observations necessary to detect and prevent checked ware, wavy ware, and ware having an uneven distribution of glass. At the present time, a skilled operator is required to watch each glass machine being operated to check the weight of the ware, to make adjustments for changes in weight, and to watch for defective ware. The task is quite arduous. In addition, the operator is required to work near the glass forming machine and furnace, where the heat is intense at all times and quite uncomfortable in warm weather. Such working conditions cause dissatisfied employees and unsatisfactory labor relations.

The present invention aims to eliminate or minimize the above difficulties by decreasing the amount of labor at or near the glass machines; by giving the operator of each machine more time for observations other than weight checking or by reducing the operator's work sufficiently to permit him to attend to additional machines and thereby reduce the cost of the ware; by eliminating or minimizing the more arduous duties of the operator, and by permitting part of his duties to be performed at a remote point; by minimizing the skill required by the operator; and by making the manufacture of glassware and weight regulation thereof more nearly automatic. The invention aims to achieve the above results in an inexpensive, practical manner, which greatly simplifies the manufacture of glass, reduces the labor required therein and improves the quality of the finished ware.

An object of the present invention is to improve the operation of glass feeders and forming machines and to reduce the percentage of imperfect ware.

Another object of the invention is to minimize the time and skill required on the part of the operator who is operating a glass feeder and forming machine.

Another object of the invention is to improve the accuracy of weight regulations by making regular and more frequent checks on the weight of the ware delivered, and to reduce the labor required in so doing.

Another object of the invention is to provide a reliable machine for mechanically and automatically checking the weight of glass containers and other glass articles as they are delivered from the machine and to automatically make adjustments in the glass feeder responsive to variations in the weight of glass articles from a predetermined standard.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is an end view, partly in section, of a forehearth or feeder spout on which is mounted a glass feeder for feeding charges of molten glass;

Fig. 2 is a fragmentary view, partly in section, illustrating a glass forming machine adapted to receive charges of molten glass and shape them into articles, together with attachments for use in connection with the invention;

Fig. 2a is a diagrammatic view of the electrical connections to the forming machine of Fig. 2;

Fig. 3 is a diagrammatic view illustrating a scale for weighing articles formed on a glass machine and the electrical connections thereto;

Fig. 3a is a schematic view illustrating automatic means for placing articles on the scales of Fig. 3 and for removing articles therefrom;

Fig. 4 is a diagrammatic view of a junction box, preferably located adjacent the scales, having a series of sockets for receiving connection plugs and showing also the wires leading therefrom to the terminal board;

Fig. 5 is a diagrammatic illustration of the electrical connections and the parts on the back of the door panel of the mechanism at the remote station;

Fig. 7 is a simplified diagram illustrating the connections of both the scales and the volume responsive device as effective upon the weight control mechanism and the signal lights;

Fig. 8 is a front view of the door of the mechanism at the remote station;

Fig. 9 is a side view of the mounting mechanism at the remote control station with the various devices mounted thereon;

Fig. 10 is a front view of the rear column of Fig. 9, which supports the relays;

Fig. 11 is a diagrammatic view of the operating means for the shears, shear spray and needle; and Fig. 12 is an illustration of a synchronized means for electrically controlling the shears, shear spray and needle.

Described generally, the present invention is intended to be applied to various types of glass feeders and forming machines automatically to regulate the feeder responsive to the weight of the charges delivered. If, due to temperature or other conditions, the charges delivered become too heavy, the feeder is automatically adjusted to feed charges of the correct weight. If, for any reason, the charges delivered become too light, an opposite adjustment is made to obtain correct weight. In addition, the mechanism for achieving the above objects is of a compact nature and of a character whereby it may be located at a remote central station or control room. Any number of the control devices may be located at one point in a confined area and a single operator may watch a number of the devices, each regulating a single machine or feeder. In addition, the feeder may be adjusted both at the remote station by the control mechanism, and at the feeder. Likewise, the control mechanism may be stopped and started or cut in and out at both points. The construction permits substantially instantaneous change over from one type of forming machine to another and from one type of regulation to another to avoid loss of time. In addition, suitable light indications advise the operator at the machine and at the remote control station as to the constancy and accuracy of the weight of molten glass being delivered.

The mechanism for achieving the above results comprises generally a scale on which the molded articles are weighed or, with certain types of machines, a device by which the volume of the charge in the mold is accurately measured. If the scale or the volume measuring device indicates that the weight of the charges being delivered differs a predetermined amount from the correct weight, electrical contacts are closed, there being a separate contact for overweight and another for underweight. The closing of the contacts operates a series of relays which start and operate a motor or other device for changing the feeder adjustment a predetermined amount. The closing of the contacts also operates, through suitable relays, lights at the feeder and at the remote control station to indicate whether or not the charge is too heavy or too light and to put out the lights which normally indicate exact weight, at the feeder and at the remote control station. The structure embodies various additional and supplemental features which will be described in detail hereinafter in connection with the detailed description of the preferred embodiment.

Figure 1:
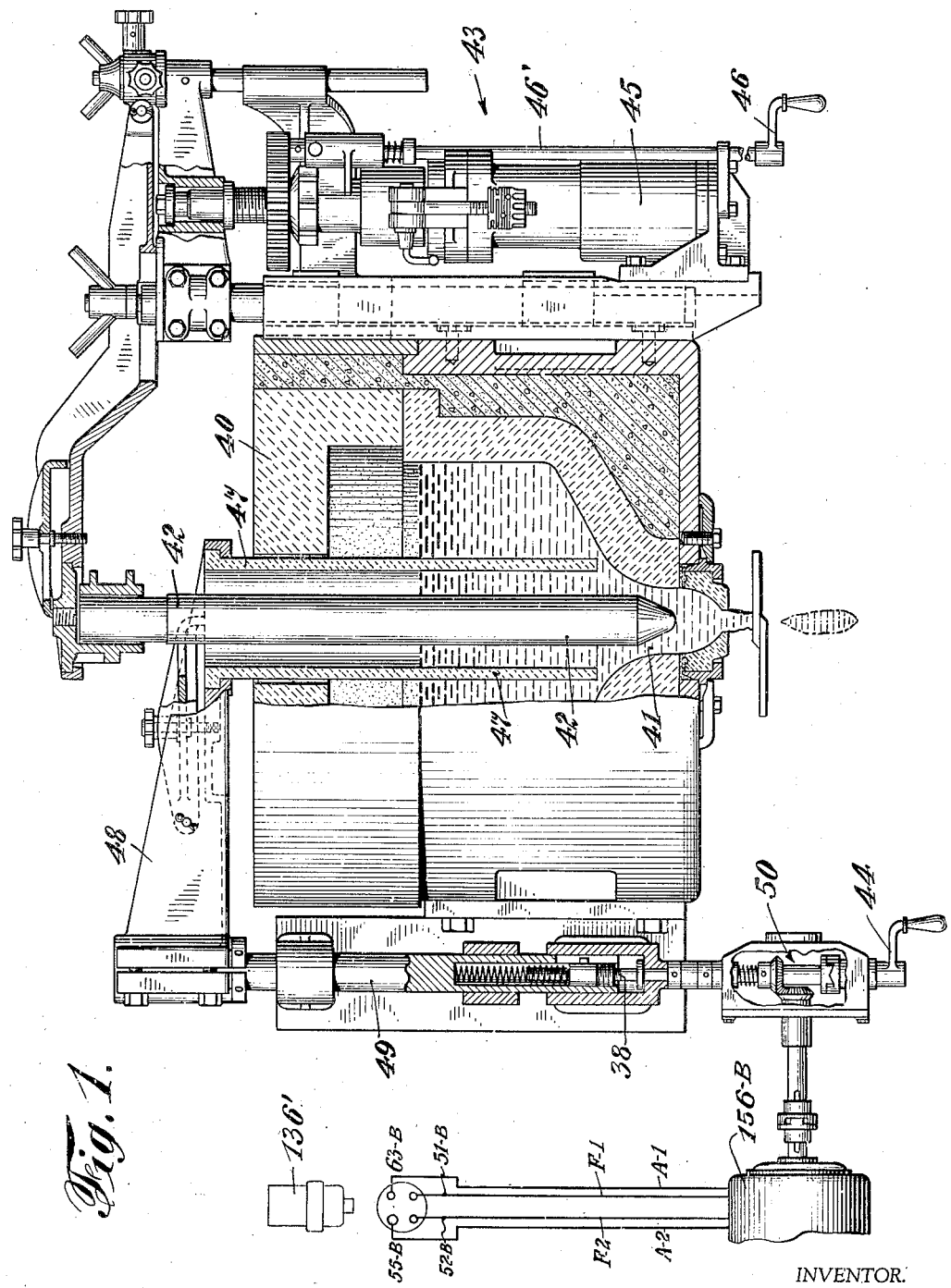

The description of the preferred embodiment of the invention will be given below in the following order: (a) a general description of the glass feeder (Fig. 1); (b) a general description of the forming machine (Fig. 2); (c) a detailed description of the electrical connections to the forming machine (Figs. 2 and 2a); (d) a description of the scale and electrical connections therefor (Fig. 3); (e) the mechanism for automatically placing ware on the scale and removing it therefrom (Fig. 3a); (f) the electrical connections and devices for adjusting the feeder responsive to variations in the weight of the charges delivered (Figs. 4 to 7); (g) the preferred means for assembling the various devices into a single unit (Figs. 8, 9 and 10); and (h) additional devices adapted to be operated by the control mechanism (Figs. 11 and 12). These will now be described in the order given above.

*Glass feeder*

Referring again to the drawings, and more particularly to Fig. 1, there is shown, partly in section, a feeder spout or forehearth 40, through which molten glass flows from a furnace to an orifice 41 in the bottom of the forehearth in the usual manner. A reciprocating needle 42 is mounted above the orifice for forcing molten glass periodically through the orifice to be severed into charges as shown. The mechanism 43 at the right side of the feeder spout is adapted to reciprocate the needle vertically once during the delivery of each charge. The details of this mechanism, which is intended to represent feeding mechanisms generally, will not be described as no claims are being made to this mechanism per se. Ordinarily, an air cylinder 45 raises and lowers the needle 42 and the height to which the needle is raised and the depth to which it is lowered may be controlled by a crank 46 on a shaft 46'. The weight of the charges of molten glass may be controlled by this adjustment, if desired.

A tube 47 extends about the needle with its lower end spaced slightly from the bottom of the forehearth directly above and around the outlet orifice 41. In the present construction, the weight of the charges is preferably controlled by the elevation of the tube 47. By lowering the tube to within certain limits of the orifice, the weight of the charges may be decreased and, by raising the tube, the weight may be increased. If the tube is lowered to the bottom of the channel, the flow is cut off entirely.

The control tube 47 is supported by an arm 48 on a vertical shaft 49 operatively connected through gears 50 to motor 156—B. When the motor rotates in one direction, the shaft 49 is lowered through the screw connection 38 and, when the motor rotates in the opposite direction, the tube is raised in the same manner. If it is desired to operate the feeder manually, the tube may be raised or lowered by the crank 44. It will be understood that the connection of the motor for raising or lowering the tube is to illustrate generally the making of any desired feeder adjustment. For example, the motor could be connected to the shaft 46', which regulates the position of the needle to change the weight of the charges delivered. An additional control by means of regulating the speed of the feeder and the forming machine is described in detail hereinafter.

*Forming machine and attachments*

The charges delivered by the glass feeder shown in Fig. 1 drop into the molds of a forming machine 70, one type of which is illustrated in Fig. 2. The machine comprises a rotatable table 71 on which a plurality of molds 72 are mounted, only one mold being shown for simplicity. A suitable air cylinder 73, operatively connected through a rod to a plunger 74, forces the plunger into the mold to press the molten glass, previously delivered to the mold by the feeder, into a desired form. The table rotates intermittently in accordance with the usual practice to present the molds to the feeder and to the plunger 74. Further details of the forming machine are not included since no claims are being made to it per se except to the attachments utilized in connection with the present invention. These attachments will now be described.

An extension 76 is mounted on the plunger rod 75 to perform two functions as the plunger is pressed down into the mold 72. First, the end of the extension 76 engages an arm and roller for operating a limit switch 77 to indicate that the plunger is in position within the mold. Secondly, the extension 76 contacts an arm 78 on a bell crank 79 which has another arm 80 engaging a rod 81. It will be noted that the arm 80 and the rod 81 will be moved a distance depending upon how far the plunger 74 is forced down into the mold 72. If a small charge is delivered to the mold, the plunger will go down a greater distance than with a large charge therein. In other words, the rods 80 and 81 move responsively to the distance the plunger 74 goes into the mold. Hence, these rods, in effect, measure the volume of glass in the mold, which is of course proportional to the weight of the charges delivered and to the weight of the articles formed therefrom.

The rod 81 (Figs. 2 and 2a) controls a plurality of electrical contacts in the casing 82 (Fig. 2). Referring more particularly to Fig. 2a, contacts 89 controlled by rod 81 are closed when there is a light charge in the mold 72 and the plunger 74 goes down an excessive amount. When there is a heavy charge in the mold and the plunger 74 does not go down far enough, the rod 81 is not moved at all and the contacts 90 are permitted to remain closed. Where the charge is of proper weight, the contacts 90 are opened without closing the contacts 89. Hence, both of the contacts 89 and 90 are open when the plunger 74 presses a charge of proper weight in the mold 72. The purpose of the opening and closing of said contacts will be described in detail hereinafter.

On the opposite side of the forming machine 70 (Figs. 2 and 2a), there is a limit switch 92 closed by a cam 93 on the table 71 of the forming machine for the purpose of preventing the closing or opening of the contacts 89 and 90 from being effective except when this limit switch is operated. The circuit through contacts 89 and 90 is in series with this switch and is open when switch 92 is open. The purpose of this is to confine the weight regulation to a single mold and to eliminate irregularities which may possibly occur in different molds. A second limit switch 94 (Figs. 2 and 2a) is in series with switch 92 and is operated by a cam 95 on the machine timer. The machine timer as is well known in the art, and hence not described in detail herein, has a series of cams for operating air valves which rotate the table 71, raise and lower the plunger 74 and time the performance of various other operations. The timer may be positioned on a support at any suitable place in the vicinity of the forming machine, but for convenience is shown detached at the upper left side of Fig. 2 of the drawings. The limit switch 94 is closed when the machine timer indicates that the plunger should be completely down at the bottom of its stroke and is to prevent the closing or opening of the contacts 89 and 90 from being effective except when this limit switch is closed. The third limit switch 77 (Figs. 2 and 2a) is in series with limit switches 92 and 94, and is operated by the extension 76 on the plunger rod 74. This switch, as well as switch 94, is to prevent the opening and closing of contacts 89 and 90 from being effective except when the plunger 74 is in its lower position. Some impediment may prevent the operation of the plunger in response to the timer control therefor. All three switches 77, 92 and 94, must be closed for the closing of contacts 89 and 90 to be effective. Correct volume reading can be obtained only when the parts are in position to close the said switches and the switches assure that the measurements are taken at the proper time.

*Weighing scale and its connections*

By means of the mechanism illustrated more particularly in Figs. 2 and 2a, and also by means of the mechanism later described, the glass feeder may be regulated responsively to the variations in the volume and weight of the charges of molten glass delivered. With certain types of forming machines, particularly blow machines as distinguished from press machines and press and blow machines, it is not feasible to measure the volume of charges by the means illustrated in Fig. 2. In order to make the invention applicable to all types of forming machines, there is provided a pair of scales 98 mounted on a column or support 97, having contacts 99 and 100, illustrated more particularly in Figs. 3 and 3a. The operator may place a molded article on one side of the scales and if it is overweight, the scales will tilt to one side and, if underweight, to the other side. Electrical contacts 99 and 100 corresponding to contacts 89 and 90 in Fig. 2a, are accordingly closed by the scales. The scales are connected in the electrical hook-up so that, by throwing a switch, the control mechanism may be operated responsively to the scales or responsively to the volume measuring mechanism at will. It will be understood that, in some instances, the scales would tend to oscillate and hence might give more than one indication, that is, close the heavy or light contacts repeatedly instead of giving a single indication. To avoid this, the scales have contacts 108 which, when closed, render ineffective all closings of the contacts 99 and 100 on the light or heavy side of the scales, except the first closing. The contacts 108 are closed by the scale lock 109 which locks the scale in horizontal position before and while the article is placed on it, it being released thereafter so that the scales will give a true reading.

Automatic delivery of ware to scales

In order to make the device completely automatic, a device is provided in Fig. 3a for automatically placing containers on the scales, for unlocking the scales, and then for removing the containers from the scales. The mechanism in Fig. 3a is a modification or alternate form of the mechanism shown in Fig. 3. In the mechanism in Fig. 3, the glassware is placed on and removed from the scales manually, while in the mechanism of Fig. 3a, the glassware is placed on and removed from the scales automatically.

Referring more particularly to Fig. 3a, there is shown a takeout 110 which has a gripping mechanism at 111 for gripping the containers in a glass mold while the mold table 71' of the glass machine is stopped. The gripping mechanism 111 may be raised and lowered vertically by means of an air cylinder and moved horizontally by means of an air cylinder 114 to remove containers from the molds of the glass machine and place them on the conveyor 115. A mechanism of this general type is known in the art. The present invention contemplates the provision of a stop or latch member 116 which stops the piston substantially midway its stroke so that the containers can be dropped on the conveyor 115. Once during each revolution of the table, a valve 117 is operated by a cam 119 to admit compressed air on the right side of the piston which operates the latch member 116 to draw back the latch 116 so that the piston makes a full stroke in the cylinder 114 and deposits a container on the platform 118 of the scales 98. The piston is then returned for the full stroke to its normal position by compressed air admitted to the opposite end of the cylinder 114. As the cam 119 on the mold table passes valve 120, the latch 116 is returned to its proper position by compressed air admitted to the left side of its cylinder and the same operation of valve 120 admits pressure to the air cylinder 121 which unlocks the scale so that a weight indication is obtained. When the cam 119 on the mold table reaches the valve 122, the scales are locked again and simultaneously the cylinder 123 is operated to push the container from the scales onto the conveyor 115. The position of the valve 122 is such that the container will be pushed on the conveyor intermediate the operations of the takeout 110. A third valve 124 may be operated by the cam 119 on the mold table to connect the opposite end of the cylinder 123 to pressure for returning the pusher. It will be understood that the scales 98 are electrically connected, as indicated in Fig. 3. The mechanism in Fig. 3a is to illustrate automatic means for placing one container on the scales during each revolution of the table. Preferably, the container is taken from the same mold in each instance to eliminate irregularities which may exist in the different molds. The weighing mechanism is independent of the type of machine being used for forming the container and may be applied to any forming machine. As stated heretofore, the containers may be placed on the scales by an operator but are preferably placed on and removed from the scales by a mechanism such as that illustrated in Fig. 3a.

The junction box

As will be described hereinafter, a series of electrical circuits and devices cooperate with the scales and with the volume measuring device to automatically adjust the feeder to maintain the weight of the charges substantially constant. Before going into the circuits in detail, some of the mechanisms and their functions will be described.

A junction box is illustrated in Fig. 4 and is preferably mounted near the glass feeder, a convenient place being the column (not shown) for supporting the end of the forehearth 40 (Fig. 1). The purpose of the junction box is to provide a terminal having a series of sockets to which various mechanisms may be conveniently connected and disconnected by the insertion and removal of cable plugs. The junction box 125 has a series of sockets 126, 127, 129, 134, 135 and 136, the purposes of which will now be described. The socket 126 is adapted to receive a cable plug 126' leading from the volume measuring device (Figs. 2 and 2a). Socket 127 is adapted to receive a cable plug 127' leading from the signal lights 128 for the volume measuring mechanism (Fig. 2a). The scale mechanism also has signal lights 131 (Fig. 3) corresponding to lights 128 in Fig. 2a, which are connected, when in use, to the junction box, by the cable 132 having one end plugged into the scale receptacle 133 and the other end 127'' adapted to be plugged into the socket 127 of the junction box. If the operator desires to operate the mechanism on the volume control, the plugs 126' and 127' leading from the volume control mechanism are plugged into the receptacles 126 and 127 respectively, of the junction box. A third socket 129 is adapted to receive a cable plug 129', the opposite end of which is plugged into the receptacle 130 (Fig. 3) of the scale control mechanism. If the operator desires to operate on the scale control, the scales are connected to the junction box by inserting a plug 129' for the scale mechanism into receptacle 129 of the junction box, and by removing the light plug 127' for the volume control from receptacle 127 and substituting the light plug 127'' for the scale control.

There is also a socket 134 in the junction box for receiving the plug 169' (Fig. 11) of the shear operating, needle operating and shear spray cable, a receptacle 135 for receiving the plug 135' of the cable 170'' for the machine trip, and a receptacle 136 for receiving the cable plug 136' (Fig. 1) from the tube adjusting motor 156—B. A switch S—137 is mounted on the spout column so that the operator can conveniently cut out the entire control while working on or adjusting the machine, or while operating the machine by hand in starting up a feeder. If additional controls are desired, additional sockets may be provided in the junction box. The primary purpose of the junction box is to facilitate changing from one forming machine to another and to facilitate changing from scale responsive operation to volume responsive operation. The operator merely has to remove and insert plugs to properly connect the mechanism when forming machines are changed. In addition, cables may be more easily run from the junction box to the remote control located at some distant point. The wires, properly numbered, are indicated leaving the junction box and going to a terminal board illustrated in Fig. 5 or to the relay panel in Fig. 6. The terminal board and relay panel at the remote station also facilitate making connections.

*Control devices at remote station*

Referring more particularly to Fig. 5, which illustrates part of the mechanism located at a remote station and part of the electrical connections, there are shown lights 139 which correspond either to volume responsive lights 128 or to scale responsive lights 131, whichever is being operated. This duplicates at the remote station the light indications given at the feeder, there being three lights at each point to indicate whether the machine is delivering charges of heavy weight, light weight or exact weight. A four-pole double-throw switch S—140 is illustrated in Fig. 5 for the purpose of changing the mechanism for operating with the volume measuring mechanism (Figs. 2 and 2a) or with the scale (Fig. 3). When the switch is thrown to the right, the mechanism operates with the volume measuring mechanism and, when thrown to the left, it connects with the scale control. When the switch is left in neutral position, the glass feeder may be hand operated in the customary manner. The switches S—141 and S—142 (Fig. 5) are for stopping and starting the machine. The switches S—144 and S—145 are for changing the amount of the respective feeder adjustments made in each instance. Operation of all of these devices will be described later in detail.

*Electric power connections*

Referring further to Fig. 5, it will be noted that the power lines L—230 pass through the safety switch S—146 and through the fuses 147 to wires 51 and 52, which return to the terminal board and constitute the high voltage power lines for the mechanism, as illustrated more particularly in the simplified diagram of Fig. 7.

Power lines L—110 pass through safety switches S—148, fuses 149, transformer 150, to the low voltage lines 3 and 4, which are preferably sixteen volts in order to minimize any danger to the operator and to the mechanism. The low voltage power lines 3 and 4 pass through switch S—151 to lines 6 and 22 which, as will be seen more particularly from the simplified diagram in Fig. 7, constitute with 3 and 4 the low voltage lines for the mechanism. The switch S—151 is a double pole switch for cutting off the low voltage current while repairs are being made or at any other time desired.

*General description of control relays*

The opening and closing of contacts by the scales of Figs. 3 and 3a and by the volume measuring mechanism of Figs. 2 and 2a adjusts the feeder through relays and motors. The relays and their electrical connections are illustrated more particularly in Fig. 6. These control relays CR—1 to CR—12 are operated by the scales or by the volume measuring device, depending upon which is operatively connected to the relay mechanism by the switch S—140 (Fig. 5) and at the junction box 125 (Fig. 4). The operation of the device will be easier to follow if one keeps in mind that the odd numbered relays are effective for adjustments required by reason of the glass charges being too light and that the even numbered relays are effective for adjustments required by reason of the charges delivered being too heavy. In following the diagram (Figs. 6 and 7), it will be helpful also to keep in mind that control relays CR—7 and CR—8 are normally energized and, hence, contacts which are shown open in said relays are normally closed. Current passes through relays CR—7 and CR—8 until de-energized by a light or heavy weight indication respectively. These two relays are time-operating relays for controlling the period that the adjusting motor runs and, hence, the amount of the feeder adjustment made in each instance. The function and operation of the various relays shown in Figs. 6 and 7 will first be described without reference to the detailed electrical connections, which will later be described.

When a light weight charge is delivered, the contacts, closed either by the scale or by the volume measuring device, energize relay CR—1.

Relay CR—1 in turn operates relay CR—3 and, in addition, connects its own energizing coil through CR—7, to keep its contacts closed until CR—7 is de-energized.

Control relay CR—3, when energized, closes one pair of contacts to energize control relay CR—5 and control relay CR—11, which is connected in parallel with relay CR—5.

Control relay CR—5, when energized, closes three contacts and opens two. The closing of contacts 51—63 closes the armature circuit of, and starts the motor for adjusting the elevation of tube 47 (Fig. 1), or adjusting rheostat 159 (Fig. 6), or for making any other adjustment. Closing contacts 53—56 keeps control relay CR—5 energized independently of CR—3. Closing contacts 8—9 energizes CR—9, which becomes effective only when operating with the scale. The opening of contacts 52—69 of CR—5 de-energizes control relay CR—7, which fixes the period the adjusting motor runs, and the amount of the adjustment period during which the motor runs, fixes the amount of the feeder adjustment. Opening contacts 63—67 of CR—5 compels the current through contacts 51—63 of CR—5 to flow through the armature circuit of the motor.

Control relay CR—7 is normally energized, as pointed out above, and normally maintains both its contacts closed although they are shown in the drawings as opened. The reason for this is that the relay is normally energized and, hence, the contacts normally closed, but the contacts of all the relays are shown as they are with the relay de-energized. Hence, the apparent discrepancy in control relay CR—7. De-energizing control relay CR—7 opens contacts 6—17 and de-energizes CR—1 and CR—3. De-energizing CR—7 also opens the contacts 51—56 which de-energizes CR—5, and which, in turn, energizes CR—7 bringing the relays back to normal. Relay CR—7 is a delayed operating relay to prevent opening of its contacts for a predetermined period of time, said predetermined period during which the adjusting motor runs fixes the amount of the adjustment.

Control relay CR—9 is operated, when the scale switch 108 (Fig. 3) is closed, by CR—5 and is for the purpose of preventing more than one adjustment being made, if the scales should oscillate when the jar is placed thereon and hence closed the contacts more than once. Relay CR—9 operates only when the scales are being used.

Control relay CR—11 operated by CR—3 is effective on the lighting circuit and closes one contact and opens another. The closing of contacts 3—30 of CR—11 closes the circuit through the light which indicates light weight. The opening of the circuit through contacts 35—36 opens the circuit of the exact weight light.

As stated above, the even numbered relays in each case are identical with the next lower odd numbered relays and perform the same functions respectively when a heavy weight indication is given as the odd numbered relays perform when a light weight indication is given. In other words, CR—2 corresponds to CR—1, CR—4 to CR—3, CR—6 to CR—5, CR—8 to CR—7, CR—10 to CR—9, and CR—12 to CR—11. Hence, the above general description is not repeated with reference to the even numbered relays.

*Operation on light weight indication with volume measuring device*

The detailed connections and operation of the odd numbered relays will now be described when a light weight indication is given by the volume measuring device shown in Figs. 2 and 2a.

In operating with the volume measuring device, the plugs 126' and 127' are inserted in the sockets 126 and 127 of the junction box (Fig. 4). The switch S—137 (Fig. 4) at the feeder spout is closed and the four-pole double-throw switch S—140 (Fig. 5) is thrown to the right. Power switches S—146, S—149 and S—151 are closed. With the above parts in the positions indicated, the mechanism is ready to regulate the feeder responsively to the variations in the volume of the charges delivered.

Assuming a light charge to be delivered, which is sufficiently underweight to require an adjustment in the feeder, the plunger 74 (Fig. 2) will then go into the mold 72 further than it should. This additional distance will be communicated through arm 76 and bell crank 78 to the rod 81 (Figs. 2 and 2a) which controls contacts 89 and 90, shown in detail in Fig. 2a. The lightweight charge will cause the rod 81 to be shifted over sufficiently far to close the contacts 89 which connect together wires 11 and 12.

The closing of the contact 89 responsively to the lightweight charge and the connection of the wires 11 and 12 operates control relay CR—1, through the following connections. For simplicity, wire 11 will be followed first to one side of the low voltage power line and thereafter wire 12 will be followed to the other side. The simplified diagram in Fig. 7 will be helpful in following the detailed connections through Figs. 2a, 4, 5 and 6. Wire 11 leads from the contact 89, which has been closed by the undersized charge, and connects one side 3 of the low voltage power line through plug 126', socket 126 of the junction box (Fig. 4), closed switch S—137, the terminal board (Fig. 5), switch S—140, wire 8, and again through the switch 140, through wire 7, and thence back through the terminal board to receptacle 126 of the junction box, plug 126', contacts 77 closed by the limit switch to indicate that the plunger is down (Figs. 2 and 2a), wire 6B and contacts 94 closed by the limit switch on the machine timer (Figs. 2 and 2a), wire 6A and contacts 92 closed by the mold table (Figs. 2 and 2a), wire 6, plug 126', socket 126 of the junction box (Fig. 4) and back through the terminal board (Fig. 5) to switch S—151 and wire 3 which is one side of the low voltage power line, (Figs. 5 and 7).

Returning again to contacts 89 (Fig. 2a) which have been closed as described above, the wire 12 connects with the other side 4 of the low voltage power line through plug 126', socket 126 of the junction box, the terminal board and through switch S—140 to wire 15. Wire 15 passes to the terminal board and to the relay panel (Fig. 6) and from there through the energizing coil of control relay CR—1 (Fig. 6) and connects with wire 24, closed contacts 24—23 of CR—9, closed contacts 23—22 of CR—10 to wire 22. Wire 22 is connected to wire 4 (Fig. 5) through switch S—151, which is the other side of the low voltage power line. Thus, CR—1 is energized when contacts 89 (Figs. 2 and 2a) are closed by the delivery of a charge of glass smaller by a predetermined amount than a standard charge.

When relay CR—1 is energized, its contacts 17—15 and 17—18 are closed. The closing of contacts 17—15 connects one side 6 of the low voltage power line through contacts 6—17 of CR—7, which are normally closed because CR—7 is normally energized, directly to wire 15 and to the coil of CR—1. The closing of contacts 15—17 of CR—1 therefore causes current to continue to flow from wire 6 at contacts 6—17 or CR—7 through the coil of CR—1, wire 24, contacts 24—23 of CR—9, contacts 23—22, to wire 22, which is the other side of the low voltage line. Thus, CR—1 is kept energized until CR—7 is de-energized. Low voltage line 6 is also connected through normally closed contacts 6—17 of CR—7, wire 17, contacts 17—18 of CR—1, which connects with the other side 22 of the power line through the coil of CR—3, thereby keeping CR—3 energized until CR—7 is de-enegrized.

Figure 6:
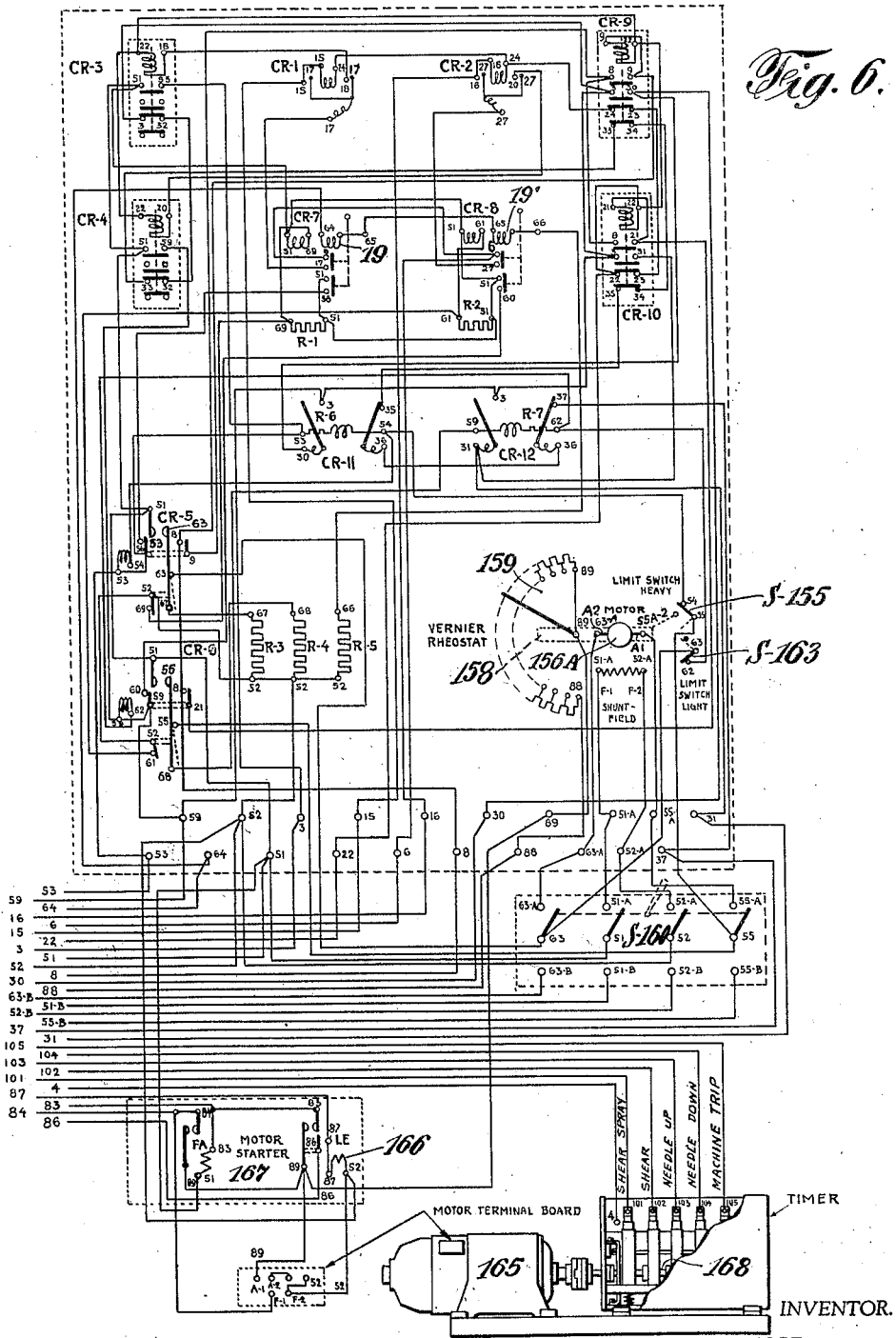
Fig. 6 is a diagrammatic view of the electrical connections on the back of the relay panel of the mechanism at the remote control station.

Control relay CR—3 closes contacts 51—53 and opens contacts 3—32. It should be noted that wire 51 connects with one side of the high voltage power line (Figs. 6 and 7). The closing of contacts 51—53 energizes CR—5 through wire 53, the coil of CR—5, wire 54, limit switch S—155, wire 55, terminal of switch S—160, closed contacts 55—68 of CR—6, wire 68, and resistance R—4 which is connected to the other side of the high voltage power line 52.

The opening of contacts 3—32 of relay CR—3 opens the circuit through the exact weight light. This circuit comprises low voltage wire 3, contacts 3—32 of CR—3, wire 32, contacts 32—33 of CR—4, wire 33, contacts 33—34 of CR—9, wire 34, contacts 34—35 of CR—10, wire 35, contacts 35—36 of CR—11, wire 36, contacts 36—37 of CR—12, wire 37, the relay panel, the terminal board, and through the exact weight light at 139 which is connected with the other side 4 of the low voltage line. This puts out the exact weight light at the remote control point (Fig. 5) and also puts out the exact weight light at the feeder (Fig. 2a), since the latter is connected in parallel with the remote exact weight light through wire 37, terminal board, socket 127 of the junction box (Fig. 4), plug 127' and to exact weight light at 128 (Fig. 2a) which is connected to the low voltage power line 4.

Control relay CR—5, operated by contacts 51—53 of CR—3, closes contacts 51—63, 53—56, and 8—9 and, at the same time, opens contacts 52—69 and 63—67.

The closing of contacts 51—63 of CR—5 connects one side 51 of the high voltage power line to motor 156A for the operation thereof, through wire 63, switch S—160, wire 63A, sides A—1, A—2 of the armature of motor 156A, wire 55a, switch S—160, wire 55, closed contacts 55—68 of CR—6, wire 68, and resistance R—4, which is connected to the other side 52 of the high voltage line. This starts the motor which, in turn, makes the feeder adjustment to increase the weight of charges of molten glass delivered. As shown in Fig. 6, the motor is connected through a shaft 158 to a vernier rheostat 159. The vernier rheostat, as will be described later, is in series with the armature of the motor driving the machine and feeder. Thus, the adjustment of the rheostat increases or decreases the speed of the forming machine and feeder which, in turn, changes the weight of the charges delivered, as described more particularly in my prior patent, No. 2,052,578, granted September 1, 1936.

It is to be understood that the motor 156A, which is operated as described above, may operate any suitable adjusting device. A four-pole double-throw switch S—160 is shown in Fig. 6. By having this switch in its upper position, the motor 156A is operated to adjust the vernier rheostat 159 which, in turn, adjusts the speed of motor 165 (Fig. 6). By having the switch S—160 in its lower position, any other motor may be operated to effect a different adjustment. In this particular case, when the switch is down, the motor 156B (Fig. 1) is operated through wires 63B and 55B leading to the armature circuit thereof and through wire 51B and 52B to the field circuit thereof to raise and lower the tube, as previously described herein and as will be described more in detail hereinafter.

Referring further to control relay CR—5, the closing of contacts 8—9 is ineffective while operating with the volume measuring device and, hence, will not be described at this point but will be described when describing the operation of the device with the scale control, in which case CR—9 is operated by the scale limit switch to prevent more than a single operation of CR—5 when a jar is placed on the scales.

The closing of contacts 53—56 of CR—5 connects one side of the coil of CR—5, through wire 56, contacts 56—51 of CR—7 to the high voltage line 51. This keeps CR—5 energized independently of CR—3 until CR—7 is de-energized.

The opening of contacts 52—69 of CR—5 breaks the circuit through the energizing coil CR—7 since the wire 69 connects with one side of the coil, the other side being connected to power line 51.

The opening of contacts 63—67 of CR—5 prevents current from going direct from line 51 through contacts 63—51, wire 57, resistance R—3, to the other side of the power line 52, without going through the motor circuit. In other words, the opening of these contacts 63—67 prevents the flow of current around the motor circuit through the resistance R—3 (Figs. 6 and 7).

Control relay CR—7 is a delayed operating relay and is normally energized through power line 51, coil of CR—7, wire 69, and normally closed contacts 69—52 of CR—5 and power line 52. Thus, contacts 6—17 and 51—56 of relay CR—7 are normally closed, although shown open in the drawings. Relay CR—7 is de-energized, as described above with reference to CR—5, by the opening of the contacts 52—69 of CR—5, and when de-energized, relay CR—7 opens its contacts 6—17 and 51—56. Opening contacts 6—17 of CR—7 deenergizes CR—1 through wire 17, closed contacts 17—15 of CR—1, wire 24, contacts 24—23 of CR—9, wire 23, contacts 23—22 of CR—10 and low voltage power line 22. The opening of contacts 6—17 also de-energizes CR—3 through wire 17, contacts 17—18 of CR—1 and wire 18 and low voltage line 22. The opening of contacts 51—56 of CR—7 de-energizes CR—5 through wire 56, contacts 56—53, wire 53 and coil of CR—5. Relay CR—7 is adjusted to open a predetermined period after its circuit is opened. This delayed operation permits the adjusting motor to run for a period which fixes the amount of the feeder adjustment. The purpose of the resistance R—1 connected in parallel with the coil of CR—7 is to obtain the proper reactance which will assure the proper lapse of time between the breaking of the circuit and the opening of the contacts controlled by CR—7.

Control relay CR—9 operates only when the mechanism is being used with the scales, shown in Fig. 3, and will be treated in the description of the scale operation.

The control relay CR—11 is for operating the indication lights 139 (Fig. 5), 128 (Fig. 2a) and 131 (Fig. 3). The coil of CR—11 is connected in parallel with the coil of CR—5 and is energized and de-energized with CR—5, through wires 53 and 54 (Figs. 6 and 7). The resistance R—6 is to permit the relay to be used on the high voltage circuit and is merely for the purpose of reducing the voltage effective on the relay coil and permitting it to be used on the high voltage line. Energizing CR—11 closes contacts 3—30 and opens contacts 35—36. The closing of contacts 3—30 connects the light weight lights 128 and 139 at the remote station and the feeder station, respectively, to the low voltage power lines 3 and 4. The circuit comprises contact 30 of CR—9, wire 30, the terminal board, light weight light at the station 139, which is connected to the other side 4 of the power line. The lights at the remote station are in parallel therewith and the light weight light is correspondingly lighted at 128 (Fig. 2). The opening of contacts 35—36 of control relay CR—11, puts out the exact weight light by opening its circuit, as described in connection with contacts 3—32 of CR—3 which are connected in series therewith.

The closing of contacts 89 (Fig. 2a) due to an undersized charge and the connecting of wires 11 and 12, puts out the exact weight light at the feeder station 128 and at the remote station 139. The light weight light is then lighted at the feeder station and at the remote station by CR—11. Relay CR—5, operated by CR—3, which in turn is operated by CR—1, starts the adjustment motor 156A or 156B depending upon the position of switch S—160, and effects a feeder adjustment by changing the vernier rheostat 159 (Fig. 6) or by raising the tube 47 (Fig. 1). The amount of the adjustment is controlled by the time that the motor is in operation which, in turn, is controlled by a control relay CR—7. CR—7 is a delayed operation relay. In other words, after the circuit is opened, the coil continues to hold the contacts closed for a predetermined period. This period is determined by the resistance 162 (Figs. 5, 6 and 7) and the bucking coil 19 in series therewith. The resistance 162 is variable and may be adjusted to increase or decrease the delay in the opening of the contacts of relay CR—7 after its circuit is broken. The circuit, through the resistance 162 is from one side of the power line 51 through resistance 162, line 64, the terminal board, the relay panel, bucking coil 19, wire 65, bucking coil 19' of CR—8, line 66, and resistance R—5 which connects with the other side 52 of the power line.

When the contacts of CR—7 have opened, the motor stops. If the next succeeding weight is still light, a further adjustment may be made until the weight of the charges delivered is normal.

*Operation on heavyweight indication with volume measuring device*

As explained above, the even numbered relays operate on a heavy weight indication in the same way that the odd numbered relays operate on a light weight indication, that is, CR—2 is operated when a heavy weight indication occurs. Relay CR—2 in turn operates CR—4. Relay CR—4 operates CR—6 and CR—12, which is in parallel with CR—6. Relay CR—6 operates the motor for adjusting the feeder and CR—12 causes the correct light indications. The operation of the relays and of the volume responsive device should be clear from the description already given but, to avoid confusion, differently numbered wires were used with the even numbered relays and, for this reason, the following tracing of the sequential operations occasioned by the delivery of a heavy charge will be given.

If the charge in the mold 72 (Fig. 2) is too heavy, the plunger 74 will not go down far enough. Hence, the contacts 90 will not be opened by engagement of the bell crank 78 with the rod 81 (Figs. 2 and 2a). Thus, the electrical contacts will be as shown in Fig. 2a and the wires 11 and 14 will be connected. Wire 11 is in common with one side of the contacts for both light and heavy charges and it was traced to the side 6 of the low voltage circuit in connection with the light weight indication through contacts 77, 94 and 92 (Fig. 2a), and switches S—137 (Fig. 4) and S—149 (Fig. 5), and is not being repeated here. The wire 14 at the other side of the contacts 90 connects with the other side 4 of the low voltage line through plug 125', receptacle 126 of the junction box, the terminal board, switch S—149, wire 16 and back through the terminal board, and through the relay panel, the coil of CR—2, wire 24, contacts 24—23 of CR—9, wire 23, contacts 23—22 of CR—10, wire 22, back through the terminal board and switch S—151 to wire 4.

Relay CR—2, thus energized, closes contacts 16—27 and 20—27. The closing of contacts 16—27 connects the low voltage side 6 of the power line to the coil of CR—2 and to the other side 22 of the line through contacts 6—27 of CR—8, wire 27, contacts 27—16, wire 16, coil of CR—2, wire 24, contacts 24—23 of CR—9, wire 23, contacts 23—22 of CR—10 which connects with the other side 22 of the power line to keep CR—2 energized as long as contacts 6—27 of CR—8 are closed. Relay CR—3 is normally energized and, hence, its contacts are closed until the circuit through CR—3 is opened by the operation of CR—6, as will be explained later.

The closing of the contacts 20—27 of CR—2 energizes relay CR—4 by connecting power from one side 6 of the low voltage line through contacts 6—27 of CR—8, wire 27, contacts 27—20 of CR—2, wire 20 and the coil of CR—4 to wire 22, which is the other side of the low voltage line.

Control relay CR—4, when energized by CR—2, closes contacts 51—59 and opens contacts 32—33. The closing of contacts 51—59 energizes CR—6 by connecting one side of the power line 51 to the coil of CR—4 through wire 59, the coil of CR—6, wire 62, limit switch S—163, wire 63, closed contacts 63—67 of CR—5 and resistance R—3, which connects with the other side 52 of the high voltage power line. The opening of contacts 33—32 of CR—4 opens the exact weight light circuit which was traced in connection with the opening of contacts 3—32 of CR—3, and need not be repeated here.

Control relay CR—6 when energized by relay CR—4, operates the motor 156A for adjusting the feeder. It closes contacts 51—55, 59—60, 8—21 and at the same time opens contacts 52—61 and 55—68. The closing of contacts 51—55 starts the motor 156A by connecting one side 51 of the high voltage power line through wire 55, switch S—160, wire 55A, armature circuit of motor 156A, wire 63A, switch S—160, wire 63, normally closed contacts 63—67 of CR—5, wire 67 and resistance R—3 which connects with the other side 52 of the high voltage power line. It is to be noted that CR—6 passes current through the armature circuit in a direction opposite to the current passed by CR—5. The field current is not changed. Control relay CR—6 starts the motor in reverse and makes the desired adjustment of the feeder to decrease the weight of the charges being delivered.

The closing of contacts 59—60 of relay CR—6 energizes the coil of CR—6 through wire 60, contacts 60—51 of CR—8, direct to one side of the power line 51, which keeps CR—6 energized independently of CR—4 until CR—8 is de-energized, as described hereinafter.

Contacts 8—21 of relay CR—6 are ineffective upon control relay CR—10, except when the scale is being used and, hence, the circuit will not be described at this time.

The opening of contacts 52—61 of relay CR—6 opens the circuit of the coil of CR—8, thereby de-energizing it. The circuit runs from wire 61 through the coil of CR—8 to wire 51, which is the other side of the power line.

The opening of contacts 55—68 of CR—6 compels the current of the high voltage line caused by the closing of contacts 51—55 to flow through the armature circuit of the motor 156A rather than through wire 68 and resistance R—4 to the power line 52.

Control relay CR—8 corresponds to relay CR—7 and is normally energized and the contacts thereof are normally closed, although shown open in the drawings. The operation of relay CR—6 de-energizes CR—8 and permits the contacts 6—27 and 51—60 thereof to open. The opening of contacts 6—27 opens the circuits of CR—2 and CR—4, as described with respect to said relays, and the opening of contacts 51—60 likewise de-energizes CR—6 through wire 60, contacts 60—59 of CR—6 and wire 59 connecting with the coil of CR—6. The resistance R—2 is in parallel with the coil of CR—8 to adjust the reactance to obtain the necessary delayed operation without requiring a special coil to be wound therefor. As pointed out with reference to relay CR—7, the time elapsing before the contacts of CR—8 open after its circuit is broken, may be changed by means of the adjustable rheostat 162 (Figs. 5 and 7). The motor continues to run until CR—8 opens its contacts. Hence, the amount of the feeder adjustment in each instance may be changed at will. The circuit through rheostat 162 has been given in the description of CR—7.

The control relay CR—10 is energized only when the limit switch of the scales is thrown and when the device is operating with the scales. Hence, it is not being described here as it is ineffective with the volume responsive regulating device now being described.

The coil of control relay CR—12 is in parallel with the coil of control relay CR—6 and is energized at the same time. The resistance R—7 is for the purpose of reducing the voltage on the coil and to permit it to be operated on the high voltage circuit. The energizing of CR—12 closes contacts 31—3 and opens contacts 36—37. Closing contacts 31—3 connects one side 3 of the low voltage line to the line 31 which lights the light indicating heavy weight at the remote station 139 (Fig. 5) and also the light in parallel therewith at the feeder station 128 (Fig. 2a). The opening of contacts 36—37 opens the exact weight light circuit, the circuit for which is described with reference to contacts 3—32 of CR—3, which are in series with contacts 36—37.

*Operation on light weight indication with scales*

The above explains in detail the operation of the mechanism, and particularly the relays and adjusting motor when operated by the volume measuring mechanism. The operation is substantially the same when the scale mechanism is utilized except that with the scale mechanism a limit switch 108 is operated by the scale locking and unlocking device 109 (Fig. 3). The scale locking mechanism is to hold the scale platform in horizontal position while a container is placed thereon and, thereafter, to release the scales for a reading. The contacts for switch 108 cooperate with the locking mechanism and with relays CR—9 and CR—10 so that no reading can be obtained except when the scales are unlocked and then only one reading prior to being locked again.

To change the mechanism over for scale operation, it is merely necessary to remove the plug 127' from the receptacle 127 of the junction box and replace it with the plug 127" connected through a cable 132 to the scales. This renders the mechanism effective upon the scale lights instead of the lights of the volume measuring device. If the other cable 138 for the scale contact wires is not connected with receptacle 129 of the junction box by the cable plug 129', it should be so connected. In addition, switch S—140 (Fig. 5) should be thrown to the left.

The mechanism is then ready for scale operation. The scale being in locked position as illustrated in Fig. 3, a container 164 is placed on one platform of the scale manually in accordance with Fig. 3 or automatically in accordance with the mechanism shown in Fig. 3a. Thereafter, the handle of the locking mechanism 109 is moved down to unlock the scales and such movement automatically closes contacts 108, connecting wires 7 and 8. Assuming the jar 164 to be sufficiently under weight to require a correction in the feeder operation, the scale pointer will move sufficiently far over to the left (Fig. 3) to close contacts connecting wires 8 and 9. Wire 8 is connected to one side 6 of the power line through the scale limit switch 108, wire 7, and switch S—140. The wire 9 connects with control relay CR—1 (Fig. 6) through socket 130 on the scale column, cable 138, socket 129 of the junction box, terminal board, switch S—140, wire 15, terminal board to relay panel, coil of CR—1, wire 24, contacts 24—23 of CR—9, wire 23, and contacts 23—22 of CR—10 to power line 22. Thus, CR—1 is energized which, in turn, energizes CR—3 and the cycle of operation with respect to the relays and motor adjustment proceeds as previously described with respect to the volume control device, with one difference. The control relay CR—9 is operated by the scale limit switch 108 to prevent more than one operation of the relay CR—1 while the scale is unlocked. Without this relay, oscillation of the scale would cause a plurality of feeder adjustments in the weight of a single container.

The circuit through CR—9 and the scale limit switch 108 does not pass through the scale contacts 8—9 and is as follows: When the scale limit switch 108 is closed, the wire 8 is connected to wire 7 which connects with the low voltage power line 6 through wire 7, cable 138, the junction box, the terminal board and switch S—140. The wire 8 connects with the other side 22 of the low voltage power line through receptacle 130 on the scale column, cable 138, receptacle 129, junction box, switch S—140, relay panel, and contact 8 of CR—5. When CR—5 is operated to close its contacts 8—9, current passes through wire 9, coil of CR—9, to the other side 22 of the low voltage line. Relay CR—9 when energized, closes its own contacts 8—9, which pass current through the coil of CR—9 independently of contacts 8—9 of CR—5. Thus, CR—9 is kept energized until the limit switch 108 is opened. The operation of relay CR—9 opens contacts 24—23 which deenergizes CR—1 and prevents additional closings of scale contacts 8—9 due to scale oscillations from having an effect until CR—9 is de-energized by locking the scales again, which automatically opens the scale limit switch 108. Thus, only one weight correction adjustment is made, regardless of how many times the scale oscillates during the weighing operation. CR—9, through contacts 3—30, keeps the light indicating light weight on and, by opening contacts 33—34, keeps the exact weight light off until the scale limit switch is released by locking the scales.

*Operation on heavy weight indication with scales*

When the container 164 on the scale is over weight, contacts connecting wires 8 and 10 will be closed by the scale when it is unlocked. Relay CR—2 and the entire mechanism, including relay CR—10, are operated by the scale contacts connecting wires 8 and 10. The wire 8 is connected to side 6 of the low voltage power line by the scale limit switch 108, wire 7, switch S—140 and wire 6, as described above. Wire 10, connected to wire 8 by the scale contacts, connects with the other side 22 of the low voltage line through receptacle 130 on the scale column, cable 138, receptacle 129 of the junction box, the terminal board, switch S—140, wire 16, coil of CR—2, wire 24, contacts 24—23 of CR—9, wire 23, contacts 23—22 of CR—10 and wire 22, which is the other side of the low voltage line. Thus, CR—2 is energized and the cycle of operation of the other even numbered relays continues, as described above, with respect to the volume operating device with a heavy weight indication, except that CR—10 is operated with the scales.

CR—10 is operated through wire 8. One side of wire 8 is connected to the side 6 of the low voltage power line, as described above. The other side of wire 8 leads from the scale limit switch 108 through the junction box, terminal board, switch S—140, relay panel to the normally open contact 8 of CR—6. When CR—6 is energized, contact 8 connects with the power line 22 through wire 21 and coil of CR—10 to energize CR—10. Relay CR—10, when energized, closes contacts 8—21, which connects the coil of CR—10 to power line 22 to keep it energized independently of CR—6 until the scale limit switch is opened, thus preventing multiple adjustments with a single weighing occasioned by oscillations of the scale. CR—10 also closes contacts 3—31, which keeps the heavy weight light on and opens contacts 34—35, which keeps the exact weight light off until the scale limit switch is opened.

The foregoing description explains the motor operation and feeder adjustment for weight control with the volume measuring device and with the scale weighing device.

*Testing means for volume measuring device*

The invention also contemplates certain testing and controlling mechanisms for the feeder and forming machine operations, which will now be described. Referring more particularly to Fig. 2a, a test switch S—152 is shown for ascertaining whether or not the switches 77, 92 and 94 are operating in unison, which is necessary for proper operation of the control mechanism. Operation of the switch opens lines 3 and 25, which disconnects one side 3 of the low voltage power line from wire 25. Hence, lights 153 and 153a which are normally lighted are switched off. Simultaneously, wire 25 and one side of lights 153 and 153a are connected with wire 7, which in turn is connected with wire 3 through switches 77, 94 and 92, wire 6, junction box, terminal board, and switch S—151 (Fig. 5). Hence, the lights 153 and 153a will be lighted momentarily at the instant that all three of the switches 77, 94 and 92 are closed and only at that time. Therefore, by operating switch S—152, the operator can determine whether or not the three switches are properly synchronized to determine if the device is working properly. Failure of the switches 77, 94 and 92 to operate simultaneously prevents any weight adjustment, when operating with the volume measuring device shown in Figs. 2 and 2a.

*Testing means for operating relays*

Referring more particularly to Fig. 5, another test switch is shown at S—144 and S—145. The purpose of this switch is to permit the operator at the remote location to ascertain whether or not the mechanism is functioning properly. By operating the switch S—144, wire 53 is connected to wire 57 and, through wire 57 and contacts of the lower switch S—145, to one side of the high voltage power line 51. It will be noted that wire 53 passes through the terminal board to one side of the coil of CR—5, which operates the relay CR—5 and makes a weight adjustment, corresponding to what would be made by a light weight indication. Closing the lower switch 145 connects one side of the high voltage power line 51, through switch S—144, wire 58, to wire 59, which in turn passes through the terminal board to one side of the coil of relay CR—6 and causes an indication and weight adjustment corresponding to a heavy weight indication on the scale. Thus, by this testing mechanism, the operator can make a heavy or light weight adjustment at will and determine whether or not the feeder adjusting mechanism is working properly.

*Motor control for feeder and forming machine*

Referring again to Fig. 5, there are shown switches S—141 and S—142 for starting and stopping the motor 165 (Fig. 6) or any other motor being used for driving the machine. It will be noted that the pressing of the "start" button closes contacts 86—87 which operate the relays 166 of the automatic motor starter 167 through wires 86 and 87, switch S—142, terminal board and relay panel. The pressing of the "stop" button breaks the circuit between 83 and 86 and stops the motor. It is not believed necessary to describe the motor starter mechanism nor to describe the various connections through wires 83, 84, 89 and their operation in the automatic starter for the motor as any suitable automatic starter may be utilized.

The purpose of the motor 165 is to time the various operations of the feeder and forming machine, that is, to make them operate in the proper time sequence. The shaft of the motor is connected to a shaft 168 having a series of cams thereon which operatively connect one side of the low voltage power line 4 by suitable switches respectively to lines 101, 102, 103, 104 and 105. These lines pass through the relay panel to the junction box and preferably to receptacle 134 thereof. The lines are then connected by a suitable cable 169 to various operating mechanisms (Fig. 11). For example, the wire 101 may be utilized for operating a solenoid 182 (Fig. 11) which in turn operates the shear spray. The solenoid may operate an air valve which gives a puff of air that sprays oil on the shears. The wire 102 may be connected through a solenoid 183 to the low voltage power line 3 for operating an air valve which controls the operation of the shears. The wire 103 may be connected to a solenoid 184 which operates a valve to admit air to one end of cylinder 45 (Fig. 1) which will force the needle 42 up. The wire 104 may be connected to a corresponding solenoid 185 which will operate a valve to force the needle down. The details of these operating mechanisms are not given as the solenoids are applicable to operating mechanisms generally. Thus, by connecting the plug of the cable 169 into the receptacle 134, the shear, shear spray and needle operations are controlled from a timer located at any desired distance. It would not be feasible to run the air lines to the remote distance because, in that case, the time required for the increase and decrease in pressure applied at the remote station to be effective at the feeder would be too long and hence, unreliable. It will be understood that various other cams can be added to the timer 168 for controlling other mechanisms. The wire 105, for example, is connected through receptacle 135 which may be connected to the machine trip receptacle for operating the machine trip, that is, to supply compressed air for rotating the forming machine intermittently.

In certain cases, the forming machines are electrically driven, that is, are driven by a motor through a Geneva drive which gives intermittent rotation. In such cases, it is preferable to utilize a synchronizer with a series of cams at the forming machine. Switches may be operated by the cams illustrated in Fig. 12 so that lines 101', 102', 103', and 104' are connected to one side of the low voltage power line. The low voltage power may be obtained by a separate transformer 171 (Fig. 12). In this instance, there is no necessity for the wire 105 for operating the machine trip because the forming machine is motor driven. The socket 172 on the synchronizer may receive one end of a suitable cable 174 which connects with receptacle 134 of the junction box (Fig. 4) to which cable 169 is also connected for operating the shear and needle. In this way, the present mechanism may be utilized with either an air driven machine or a motor driven machine without substantial inconvenience in changing from one to the other.

Selective feeder regulating means

In describing the relays herein and in tracing the electrical circuits in the various operations, the motor 156A was used primarily for illustrative purposes, since its circuit is shown in Fig. 6. This motor is in the circuit when the four-pole double-throw switch S—160 (Fig. 6) is in its upper position so that the poles thereto are connected with lines 63—A, 51—A, 52—A and 55—A. When the switch S—160 is thrown into its lower position, the electric circuit is connected with the lines 63—B, 51—B, 52—B and 55—B which lead through the relay terminal to receptacle 136 of the junction box (Fig. 4). The motor 156—B (Fig. 1) for raising and lowering the weight regulating tube 47 has a cable with leads 63—B, 51—B, 52—B and 55—B terminating in a plug 136' adapted to be inserted in the receptacle 136 of the junction box. Thus, the motor 156—B may be readily connected to the lower poles of the switch S—160. The operator merely has to reverse the position of the switch to connect the weighing mechanism or volume measuring mechanism and the cooperating relays to either the motor 156—A, which regulates the speed of the forming machines and feeder for controlling the weight, or to the motor 156—B for raising and lowering the weight regulating tube 47. Two feeder regulating means are shown to illustrate the application of the invention to regulating means generally.

If it is desired to operate the feeder manually at any time, the switch S—140 (Fig. 5) is left in its open position, permitting manual adjustments to be made as described hereinbefore.

Mounting for electrical devices at remote station

Any suitable means may be provided for mounting the various relay switches and parts described herein. However, for convenience, a suitable mechanism is shown in Figs. 8, 9 and 10. Essentially, the mechanism comprises a front column or panel 176, which may have a suitable door 177 therein, and a rear column 178. These columns are adapted to receive the various electrical devices. The door 177 may be opened by the latch 180 to give free access to the back of panel 176 and to the front of panel 178. The indicating lights 139, test switches S—144 and S—145, starting and stopping switches S—141 and S—142, handle for operating switch S—140, vernier adjustment 162 and 163, hand adjustment for the vernier 159 and the handle for switch S—146 are on the front of the door, as illustrated in Fig. 8.

The several relays, the rheostat, and resistances are preferably on the rear column 178 and their positions have been indicated. The vernier rheostat and the motor for operating the same are likewise on the rear column. At the base of the rear column, the motor 165 is mounted with the timer 168 broken away. The mechanism thus may be moved around if desired, but is generally located in a separate part of the plant with a group of similar control devices and permitted to remain permanently in one place. By having the mechanisms centralized, a single operator may operate a plurality of feeders and forming machines.

It is believed that the operation of the device will be clear from the above description and the operation of the various parts given in connection with their explanation. Hence, a further explanation of the operation at this point would be repetition.

It will be seen that the present invention provides a mechanism which automatically controls the weight of charges being delivered by a glass machine. The adjustments in each instance are uniform and are made responsive to mechanical indications, which eliminate the human element and errors resulting therefrom. The device may be applied to any type of forming machine. It is universal in its application. A single operator may supervise the operation of a group of machines at a distant point, eliminating the necessity for an operator at each machine. The device may also be utilized for supervising the work of operators at the various machines. By selecting containers from the same mold at all times for determining the necessity for feeder adjustment, the effect of irregularities in the several molds is eliminated. In addition, the feeder has an opportunity to operate on the new adjustment before a second reading is made. The invention reduces materially the labor involved in the manufacture of glassware. In addition, the construction, being for the most part electrical, is unlikely to require repairs, as electrical devices last almost indefinitely. The location of the mechanism can be at any desired point, eliminating the necessity for adding additional machinery at or near the glass machines, where space is at a premium.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of correcting for irregularities in the mold charges delivered by a glass feeder, which method comprises feeding charges to each of a plurality of molds, measuring periodically the volume of a mold charge as it is being fabricated into a glass article, utilizing said measured volume for automatically regulating the glass feeder responsively to variations in the volume of said charge from a standard volume, and utilizing the same mold as a part of the measuring means in each case to prevent errors due to irregularities in the several molds.

2. The method of regulating the weight of glass charges fed to a glass molding machine, which method comprises feeding charges to each of a plurality of molds, measuring the volume of charges formed in each of the molds of the machine and causing variations in the measured volume of the charge in one mold of the machine to regulate the size of charges being fed, and rendering the variations in the volumes of charges in the other molds ineffective on the feeder regulation.

3. The method of regulating the weight of glass charges fed to a glass molding machine, which method comprises feeding charges to each of a plurality of molds, measuring the volume of charges formed in each of the molds of the machine by measuring the position of the forming plunger at the bottom of its stroke and causing variations in the measured volume of the charge in one mold only of the machine to regulate the size of charges being fed, and rendering the variations in the volumes of charges in the other molds ineffective on the feeder regulation.

4. In a device of the class described, the combination of a glass feeder, means including an electric motor for changing the weight of the charges delivered by said glass feeder, a forming machine for receiving and molding glass articles from the charges delivered by the feeder, mechanism for determining the weight of the charges delivered, and means responsive to said weight determining mechanism for starting said electric motor to operate said weight regulating means and means independent of the weight determining mechanism for stopping said motor after a predetermined period of operation.

5. In a device of the class described, the combination of a glass feeder, means including an electric motor for changing the weight of the charges delivered by said glass feeder, a forming machine for receiving and molding glass articles from the charges delivered by the feeder, a pair of scales for weighing the molded articles, means responsive to said scales for starting said electric motor to operate said weight regulating means, automatic means independent of the operation of the scales for stopping said motor after a predetermined period, and means for adjusting said automatic means to change said predetermined period.

6. A weighing device comprising, in combination, a balance mechanism, an electrical circuit having contacts adapted to be closed by the oscillation of said balance mechanism, and means for opening said electrical circuit to render the closing of said contacts ineffective after the first closing thereof when an article is placed on the balance to prevent a plurality of indications from being individually effective in the weighing of a single article.

7. In a device of the class described, the combination of a glass feeder, means for regulating the weight of charges delivered by said feeder, a glass forming machine having a plurality of molds thereon, means for measuring the volume of glass in one of said plurality of molds and for causing variations in the volume of glass from a predetermined volume in said mold to operate said weight regulating means, and means for preventing the variations in the volume of charges in said other molds from being effective on said weight regulating means.

8. In a device of the class described, the combination of a glass feeder, a forming machine having a plurality of molds thereon, a measuring device, means for moving the device into and out of the molds for measuring the amount of glass delivered to said molds, means responsive to said measuring device for regulating the operation of said feeder, and separate means responsive to the position of the measuring device for rendering said measuring device ineffective on said regulating means except at the end of its measuring stroke.

9. In a device of the class described, the combination of a glass feeder, a forming machine having a plurality of molds thereon, a device for entering said molds and for measuring the amount of glass delivered to said molds, electrical means for regulating the operation of said feeder, an electric circuit for operating said electrical means, a pair of electrical switches in series in said electric circuit, means for closing one of said switches at the completion of the measuring operation, and means responsive to the position of the measuring device for closing another of said switches for operating said electrical means, whereby said electrical means is operated only when both of said switches are closed simultaneously.

10. In a device of the class described, the combination of a glass feeder, a forming machine having a plurality of molds thereon, a device for entering said molds and for measuring the amount of glass delivered to said molds, electrical means responsive to said measuring device for regulating the operation of said feeder, an electric circuit for operating said electrical means, a pair of electrical switches in series in circuit for rendering said measuring device ineffective on said regulating means except upon closing of both switches simultaneously, means for closing one of said switches when said measuring device enters a mold, means responsive to the position of the measuring device in the mold for closing the other switch, and testing means to determine if said switches close simultaneously.

11. In a device of the class described, the combination of a glass feeder, an oscillatory balance mechanism, electrical contacts adapted to be closed when the balance mechanism oscillates in one direction, electrical contacts adapted to be closed when said balance oscillates in the opposite direction, means responsive to one set of said electrical contacts for reducing the weight of charges delivered by a glass feeder, means responsive to the other set of contacts for increasing the weight of charges delivered by said feeder and means for rendering ineffective the closing of said contacts subsequent to the first closing to prevent a multiplicity of adjustments during a single weighing.

12. In a device of the class described, the combination of a glass feeder, a motor for regulating the glass feeder, an electrical relay for operating said motor, a second relay for operating said first relay, and a delayed operating relay for determining the time the motor operates.

13. In a device of the class described, the combination of a glass feeder, a motor for regulating the glass feeder, an electrical relay for operating said motor, a second relay for operating said first relay, and a delayed operating relay operatively connected to one of said relays, whereby said delayed operating relay is deenergized for determining the time the motor operates.

14. In a device of the class described, the combination of a glass feeder, a motor for regulating the glass feeder, an electrical relay for operating said motor, a second relay for operating said first relay and a third relay of the delayed operated type operatively connected to one of said relays, whereby said delayed operating relay is deenergized by said connected relay to stop the motor, and means for changing the amount of the delayed operation of said third relay.

15. In a device of the class described, the combination of a glass feeder, means for regulating the weight of charges delivered by the glass feeder, means for determining the weight of charges delivered by the glass feeder, means responsive to said weight determining means for automatically adjusting said weight regulating means, means responsive to said weight determining means for indicating at a central station remote from the feeder and from the weight determining means the adjustment automatically being made and means at said remote central station for making changes in the amount of the automatic adjustments whereby an operator at said remote central station can supervise the operation of a number of feeders.

16. In a device of the class described, the combination of a glass feeder, a pair of scales adapted to weigh a glass article and adapted to oscillate during the weighing, regulating means for said feeder, means responsive to said scales for operating said regulating means, means for automatically preventing more than one operation of said regulating means during the weighing operation regardless of the number of oscillations of the scales.

17. In a device of the class described, the combination of a glass feeder, means including a motor for regulating the weight of the charges delivered by the glass feeder, an electrical relay for operating said motor, a second relay for operating said first relay and a delayed operating relay for determining the time the motor operates, a light for visibly indicating when a regulation is made and a relay for operating said light.

18. In a device of the class described, the combination of a glass feeder, an electric device for regulating the weight of the charges delivered by the feeder, a glass forming machine, means for weighing an article delivered by the glass forming machine, a plurality of electric relays at a remote location responsive to said weighing means to close the circuit through the said electric device to operate said weight regulating means when said weighing means indicates a variation of a predetermined amount from a standard weight, and an electric relay adapted to stop the operation of said electrical device after a predetermined period of operation.

19. In a device of the class described, the combination of a glass feeder, means for regulating the weight of the charges delivered by said glass feeder, an electrical device for operating said weight regulating means and a high voltage electric circuit therefor, an additional electric circuit for low voltage current, means responsive to the weight of the charges delivered for closing the additional electric circuit, means operated by the closing of the additional electric circuit for closing the high voltage electric circuit to start the operation of said electrical device and automatic means responsive to the closing of one of said circuits and operative upon the lapse of a predetermined period after the start of the electrical device to stop said electrical device, and thereby accurately determine the amount of the regulation adjustment.

20. In a device of the class described, the combination of a glass feeder, means for regulating the weight of charges delivered by said feeder, an electrical device for operating said weight regulating means, a high voltage circuit for said electrical device, a circuit for low voltage current, means responsive to the weight of the charges delivered for closing the low voltage circuit, means operated by the closing of the low voltage circuit for closing the high voltage circuit for operating said electrical device, means including a third electric circuit for determining the period said electrical device operates and the amount of the feeder regulation, and means responsive to the closing of the low voltage circuit for controlling the operation of said third circuit.

21. In a device of the class described, the combination of a glass feeder, means for regulating the weight of the charges delivered by said glass feeder, electrical devices for operating said weight regulating means including a high voltage electric circuit, an additional electric circuit for low voltage current, means responsive to the weight of the charges delivered for closing the circuit for low voltage current, means operated by the closing of the low voltage circuit for closing the high voltage circuit to operate said electrical device, means including a third electric circuit responsive to the closing of one of said circuits for stopping the operation of said electric device after a predetermined period and means for giving a visible indication of the regulation being made.

22. In a device of the class described, the combination of a glass feeder, means for regulating the weight of the charges delivered by said glass feeder, an electric device for operating said weight regulating means and a high voltage electric circuit therefor, a relay and circuit responsive to the weight of the charges delivered, a second relay and circuit responsive to said first relay for closing the circuit through said high voltage electrical device, a third relay and circuit responsive to said second relay for stopping said electrical device after it has operated for a predetermined period.

23. In a device of the class described, the combination of a glass feeder, means for regulating the weight of the charges delivered by said glass feeder, an electrical device for operating said weight regulating means and a high voltage electric circuit therefor, a relay and circuit responsive to the weight of the charges delivered, a second relay and circuit responsive to said first relay for closing the circuit through said high voltage electrical device, a third relay responsive to said second relay for stopping said electrical device after it has operated for a predetermined period, and a fourth relay responsive to said second relay for giving a visible indication of the regulation being made on the feeder.

24. In a device of the class described, the combination of a glass feeder, means for regulating the weight of the charges delivered by said glass feeder including a plurality of consecutively operated electrical relays, means responsive to the weight of the glass delivered for operating one of said relays to initiate the operation of said regulating means, means responsive to the operation of said one of said relays for operating another of said relays and means responsive to the operation of said last mentioned relay to operate a third one of said plurality of relays to stop the operation of said regulating means.

25. In a device of the class described, the combination of a glass feeder, means including an electric motor for regulating the weight of the charges delivered by said glass feeder, means including a plurality of interconnected consecutively operated electrical relays for starting and stopping said electric motor, means responsive to the weight of the glass charges delivered for operating one of said relays to start the electric motor, and means for operating another of said relays after the lapse of a predetermined time after the starting of the motor to stop the motor.

26. In a device of the class described, the combination of a glass feeder, means for regulating the weight of the charges delivered by the feeder including a plurality of interconnected consecutively operated relays, means responsive to the weight of the charges delivered for operating one of said relays when the weight of the charges exceed a predetermined amount to initiate the operation of said regulating means and means for operating another of said relays to effect the stopping of said weight regulating means after a predetermined period of operation.

27. In a device of the class described, the combination of a glass feeder, means for regulating the weight of the charges delivered by the feeder including a motor and a plurality of relays, means responsive to the weight of the glass charges delivered for operating one of said relays, means responsive to the operation of said first operated relay to initiate the starting of the motor and means responsive to said motor starting relay to effect the stopping of the motor after a predetermined period of operation.

28. In a device of the class described, the combination of a glass feeder, means for regulating the weight of the charges delivered by the feeder including a series of consecutively operated electrical relays for effecting a reduction in the weight of the charges delivered when the charges delivered by the feeder exceed a predetermined weight, and including a second series of consecutively operated relays for effecting an increase in the weight of charges delivered when the charges delivered are below a predetermined weight, means responsive to the weight of charges delivered for operating a relay in one of the series, means responsive to said operated relay for operating a second relay in said series for starting the operation of said weight regulating means and means for operating a third relay in said series for stopping the operation of said weight regulating means.

29. In a device of the class described, the combination of a glass feeder, means for regulating the weight of the charges delivered by the glass feeder, a glass forming machine, means associated with said forming machine for measuring the volume of charges delivered by the feeder, means for weighing the finished articles delivered by the forming machine, and means for operating said weight regulating means including a plurality of consecutively operated relays, a switch for operatively connecting said operating means to said volume measuring means and to said weighing means, means responsive to said measuring means and to said weighing means for operating one of said relays to initiate the operation of said regulating means, and means operative after a predetermined period from the starting of the regulating means to operate a second of said relays to stop the operation of the regulating means and limit the amount of the regulation.

30. In a device of the class described, the combination of a plurality of glass feeders, means for automatically controlling the weight of the charges delivered by the feeders responsively to the weight thereof, means for indicating at a station remote from the feeders when each control adjustment is made and means at said remote station for making changes in the amount of the automatic adjustment of said controlling means whereby the automatic operation of the feeders may be supervised at said remote station.

WILLIAM L. McNAMARA.